United States Patent
Seo et al.

(10) Patent No.: US 10,848,259 B2
(45) Date of Patent: *Nov. 24, 2020

(54) METHOD FOR TRANSMITTING/RECEIVING SYNCHRONIZATION SIGNAL FOR DIRECT COMMUNICATION BETWEEN TERMINALS IN WIRELESS COMMUNICATION SYSTEM

(71) Applicant: LG ELECTRONICS INC., Seoul (KR)

(72) Inventors: Hanbyul Seo, Seoul (KR); Byounghoon Kim, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,405

(22) Filed: Jul. 17, 2019

(65) Prior Publication Data

US 2019/0342025 A1 Nov. 7, 2019

Related U.S. Application Data

(63) Continuation of application No. 15/966,593, filed on Apr. 30, 2018, now Pat. No. 10,404,396, which is a
(Continued)

(51) Int. Cl.
*H04W 56/00* (2009.01)
*H04J 11/00* (2006.01)
(Continued)

(52) U.S. Cl.
CPC ....... *H04J 11/0073* (2013.01); *H04J 11/0076* (2013.01); *H04W 56/0015* (2013.01);
(Continued)

(58) Field of Classification Search
None
See application file for complete search history.

(56) References Cited

U.S. PATENT DOCUMENTS

| 8,848,700 B2 | 9/2014 | Ahn et al. |
| 2011/0280176 A1 | 11/2011 | Lee et al. |

(Continued)

FOREIGN PATENT DOCUMENTS

| RU | 106010 | 6/2011 |
| WO | 2000/013324 | 3/2000 |

(Continued)

OTHER PUBLICATIONS

Ericsson, et al., "Synchronization Procedures for D2D Discovery and Communication," 3GPP TSG-RAN WG1 #73 R1-132029, May 2013, 6 pages.

(Continued)

*Primary Examiner* — Kouroush Mohebbi
(74) *Attorney, Agent, or Firm* — Lee Hong Degerman Kang Waimey

(57) ABSTRACT

Disclosed is a method for transmitting, by a terminal, a synchronization signal for direct communication between terminals in a wireless communication system. In detail, the method comprises the steps of: generating a primary synchronization signal and a secondary synchronization signal for the direct communication between terminals; and transmitting the primary synchronization signal and the secondary synchronization signal, wherein the primary synchronization signal is generated on the basis of a synchronization reference cell identifier for the direct communication between terminals.

8 Claims, 26 Drawing Sheets

Related U.S. Application Data continuation of application No. 14/774,580, filed as application No. PCT/KR2014/005160 on Jun. 12, 2014, now Pat. No. 9,991,983.

(60) Provisional application No. 61/834,863, filed on Jun. 13, 2013, provisional application No. 61/865,601, filed on Aug. 13, 2013, provisional application No. 61/927,973, filed on Jan. 15, 2014, provisional application No. 61/990,661, filed on May 8, 2014.

(51) Int. Cl.
  *H04W 76/14* (2018.01)
  *H04W 72/04* (2009.01)
  *H04W 72/12* (2009.01)
  *H04W 92/18* (2009.01)
  *H04W 88/06* (2009.01)

(52) U.S. Cl.
  CPC ... *H04W 72/0413* (2013.01); *H04W 72/1215* (2013.01); *H04W 76/14* (2018.02); *H04W 88/06* (2013.01); *H04W 92/18* (2013.01)

(56) References Cited

U.S. PATENT DOCUMENTS

| | | | |
|---|---|---|---|
| 2013/0083779 | A1 | 4/2013 | Ahn et al. |
| 2014/0064263 | A1* | 3/2014 | Cheng ............... H04W 8/005 370/350 |
| 2014/0169327 | A1 | 6/2014 | Chun et al. |
| 2014/0169361 | A1 | 6/2014 | Kim et al. |
| 2014/0204809 | A1* | 7/2014 | Kim ............... H04J 13/0062 370/280 |
| 2016/0149660 | A1 | 5/2016 | Seo et al. |
| 2018/0248641 | A1 | 8/2018 | Seo et al. |

FOREIGN PATENT DOCUMENTS

| | | |
|---|---|---|
| WO | 2009022695 | 2/2009 |
| WO | 2013/015646 | 1/2013 |
| WO | 2013028018 | 2/2013 |

OTHER PUBLICATIONS

LG Electronics, "Channel Models for D2D Evaluation," 3GPP TSG-RAN WG1 Meeting #73, R1-132247, May 2013, 9 pages.
Nokia, et al., "D2D Communication," 3GPP TSG-RAN WG1 Meeting #73, R1-132318, May 2013, 6 pages.
PCT International Application No. PCT/KR2014/005160, Written Opinion of the International Searching Authority dated Sep. 24, 2014, 11 pages.
United States Patent and Trademark Office U.S. Appl. No. 14/774,580, Notice of Allowance dated Feb. 20, 2018, 8 pages.
Alcatel-Lucent, "Device discovery for D2D proximity services," 3GPP TSG-RAN WG1 #72, R1-130954, Apr. 2013, 4 pages.
LG Electronics, "On the Design of D2DSS and PD2DSCH," 3GPP TSG-RAN WG1 #76, R1-140839, Feb. 2014, 8 pages.
Russian Federation Federal Service for Intellectual Property, Patents and Trademarks Application Serial No. 2015143904, Office Action dated Sep. 23, 2016, 10 pages.
European Patent Office Application Serial No. 14811590.0, Search Report dated Oct. 21, 2016, 8 pages.
United States Patent and Trademark Office U.S. Appl. No. 15/966,593, Notice of Allowance dated May 10, 2019, 9 pages.
The State Intellectual Property Office of the People's Republic of China Application Serial No. 201810153868.3, Office Action dated Jun. 15, 2020, 5 pages.
Qualcomm Incorporated, "Techniques for D2D Communication", R1-132504, 3GPP TSG-RAN WG1 #73, May 2013, 13 pages.

* cited by examiner

FIG. 2
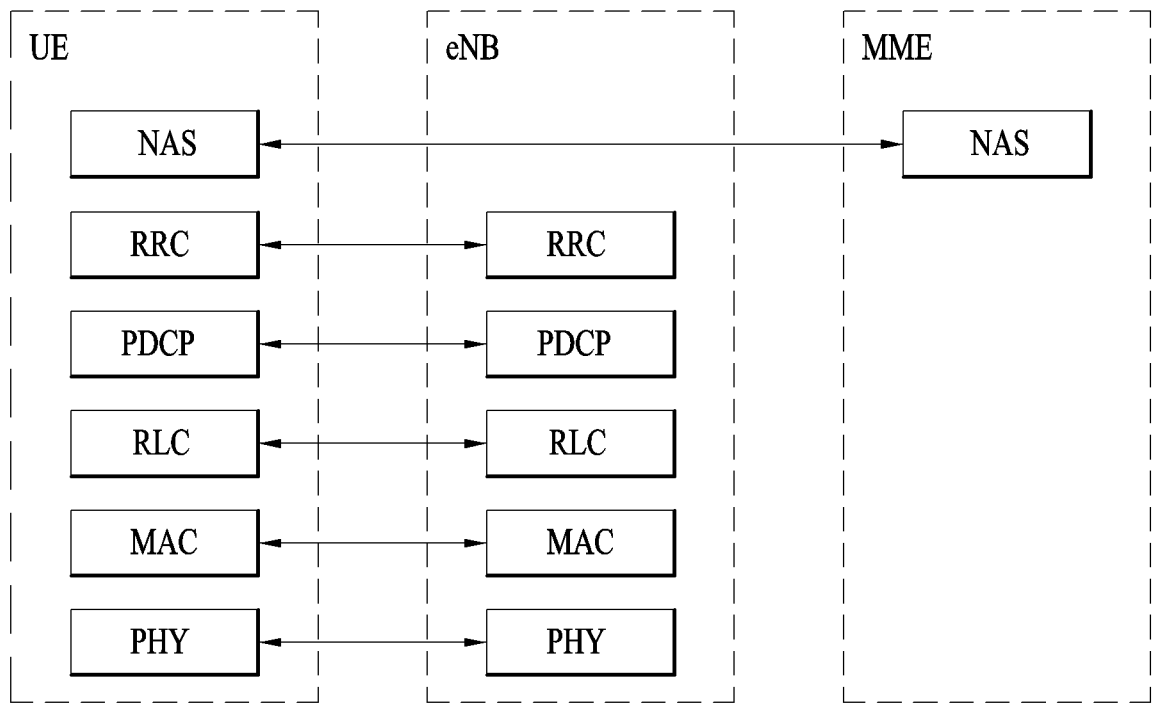
(a) CONTROL-PLANE PROTOCOL STACK
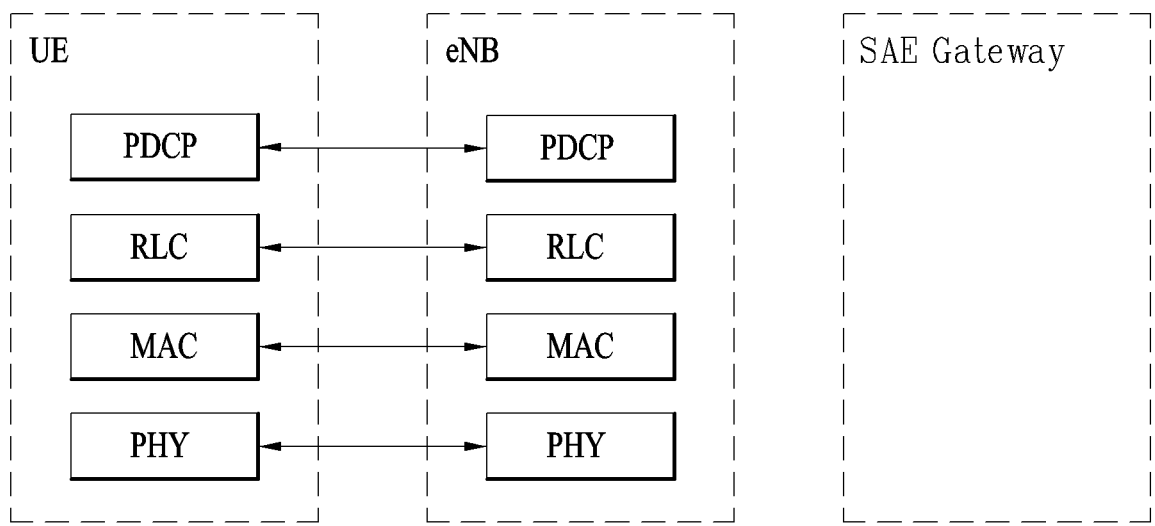
(b) USER-PLACE PROTOCOL STACK

▨ : DMRS GROUP 1

▩ : DMRS GROUP 2

METHOD FOR TRANSMITTING/RECEIVING SYNCHRONIZATION SIGNAL FOR DIRECT COMMUNICATION BETWEEN TERMINALS IN WIRELESS COMMUNICATION SYSTEM

CROSS-REFERENCE TO RELATED APPLICATIONS

This application is a continuation of U.S. patent application Ser. No. 15/966,593, filed on Apr. 30, 2018, now U.S. Pat. No. 10,404,396, which is a continuation of U.S. patent application Ser. No. 14/774,580, filed on Sep. 10, 2015, now U.S. Pat. No. 9,991,983, which is the National Stage filing under 35 U.S.C. 371 of International Application No. PCT/KR2014/005160, filed on Jun. 12, 2014, which claims the benefit of U.S. Provisional Application No. 61/834,863, filed on Jun. 13, 2013, 61/865,601, filed on Aug. 13, 2013, 61/927,973, filed on Jan. 15, 2014 and 61/990,661, filed on May 8, 2014, the contents of which are all incorporated by reference herein in their entirety.

TECHNICAL FIELD

The present invention relates to a wireless communication system and, more particularly, to a method of transmitting and receiving a synchronization signal for direct communication between terminals in a wireless communication system, and an apparatus for the same.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method of transmitting and receiving a synchronization signal for direct communication between terminals in a wireless communication system, and an apparatus for the same.

Technical Solution

The object of the present invention can be achieved by providing a method of a synchronization signal for device-to-device (D2D) communication by a terminal in a wireless communication system, including generating a primary synchronization signal and a secondary synchronization signal for D2D communication, and transmitting the primary synchronization signal and the secondary synchronization signal, wherein the primary synchronization signal is generated based on a synchronization reference cell identifier for D2D communication.

Preferably, the transmitting may include transmitting the primary synchronization signal, and then transmitting the secondary synchronization signal. In addition, a time gap having a predetermined length may be present between the primary synchronization signal and the secondary synchronization signal.

More preferably, the method may further include transmitting a residual signal using transmission power having a predetermined magnitude before transmitting the primary synchronization signal and the secondary synchronization signal.

Additionally, the transmitting may include repeatedly transmitting each of the primary synchronization signal and the secondary synchronization signal a predetermined number of times. In this case, the primary synchronization signal and the secondary synchronization signal may be repeated different numbers of times.

In another aspect of the present invention, provided herein is a terminal device performing D2D communication in a wireless communication system, including a wireless communication module for exchanging a signal with a base station or the other terminal device performing D2D communication, and a processor for processing the signal, wherein the processor controls the wireless communication module to generate and transmit a primary synchronization signal and a secondary synchronization signal for D2D communication, and the primary synchronization signal is generated based on a synchronization reference cell identifier for D2D communication.

Preferably, the processor may control the wireless communication module to transmit the primary synchronization signal, and then transmit the secondary synchronization signal. Alternatively, the processor may control the wireless communication module such that a time gap having a predetermined length is present between the primary synchronization signal and the secondary synchronization signal.

More preferably, the processor may control the wireless communication module to transmit a residual signal using transmission power having a predetermined magnitude before transmitting the primary synchronization signal and the secondary synchronization signal.

Additionally, the processor may control the wireless communication module to repeatedly transmit each of the primary synchronization signal and the secondary synchronization signal a predetermined number of times. In this case, the primary synchronization signal and the secondary synchronization signal are preferably repeated different numbers of times.

Advantageous Effects

According to embodiments of the present invention, it is possible to more efficiently transmit and receive a synchronization signal for direct communication between terminals in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

BEST MODE

Figure 1:
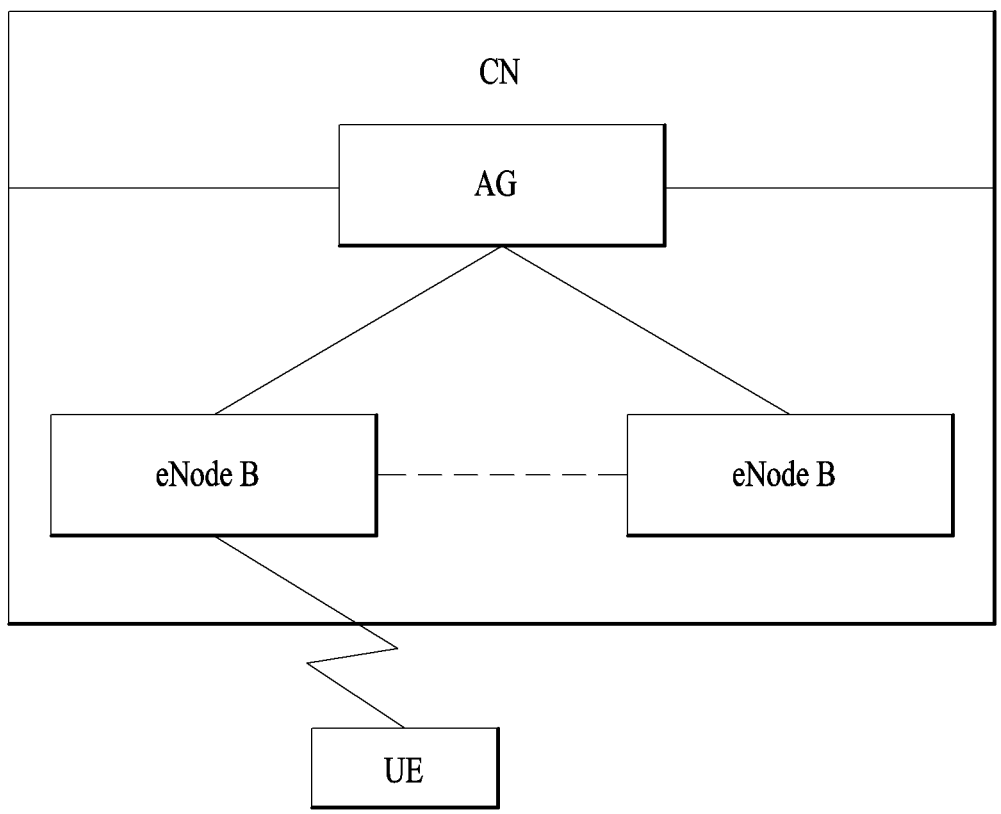
FIG. 1 is a diagram showing a network structure of an Evolved Universal Mobile Telecommunications System (E-UMTS) as an example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
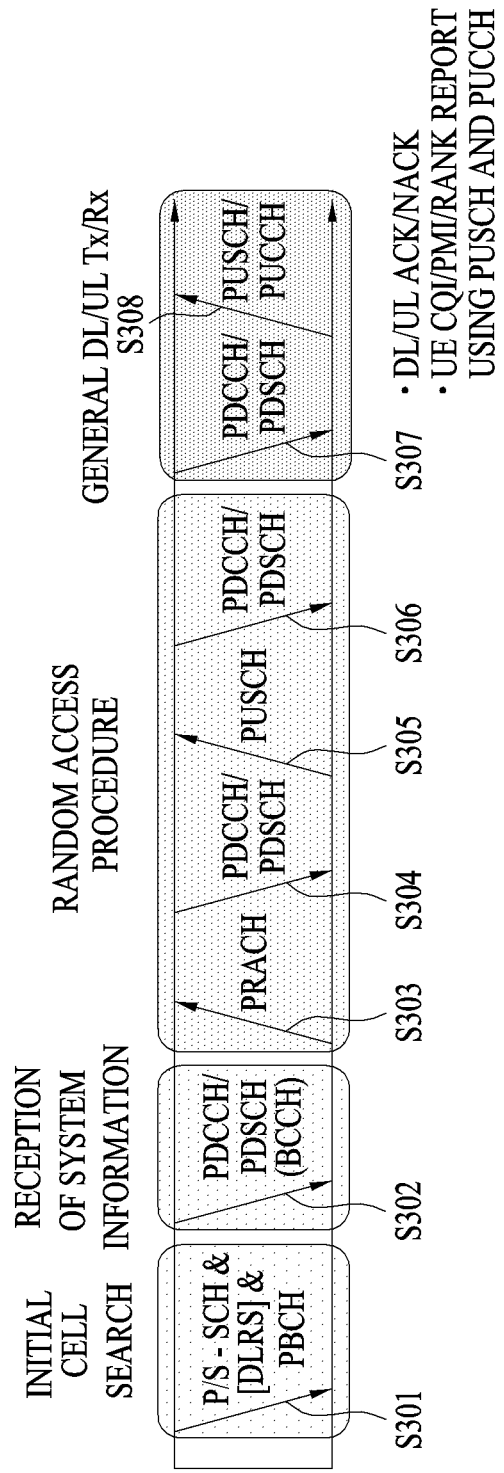
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
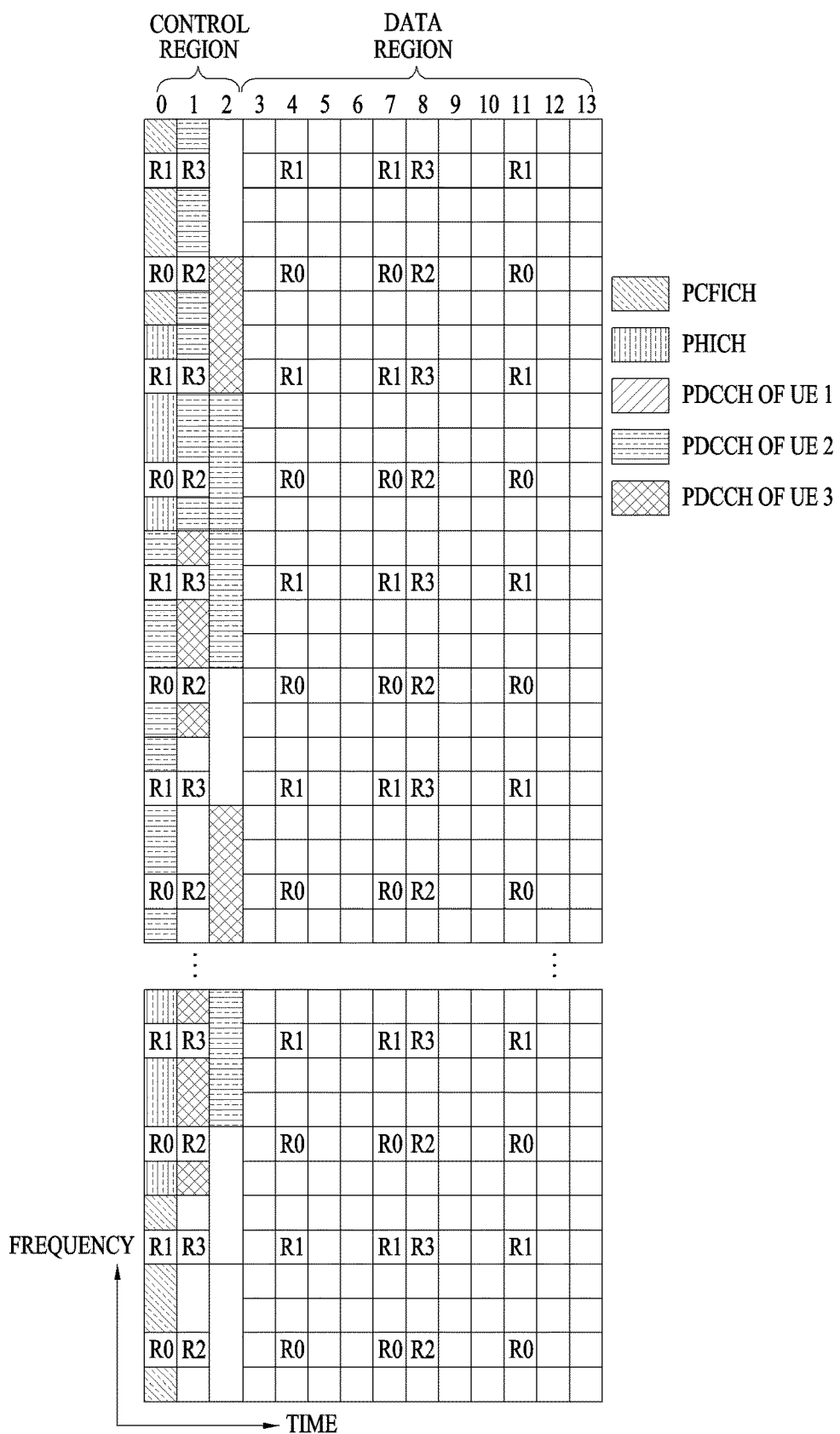
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
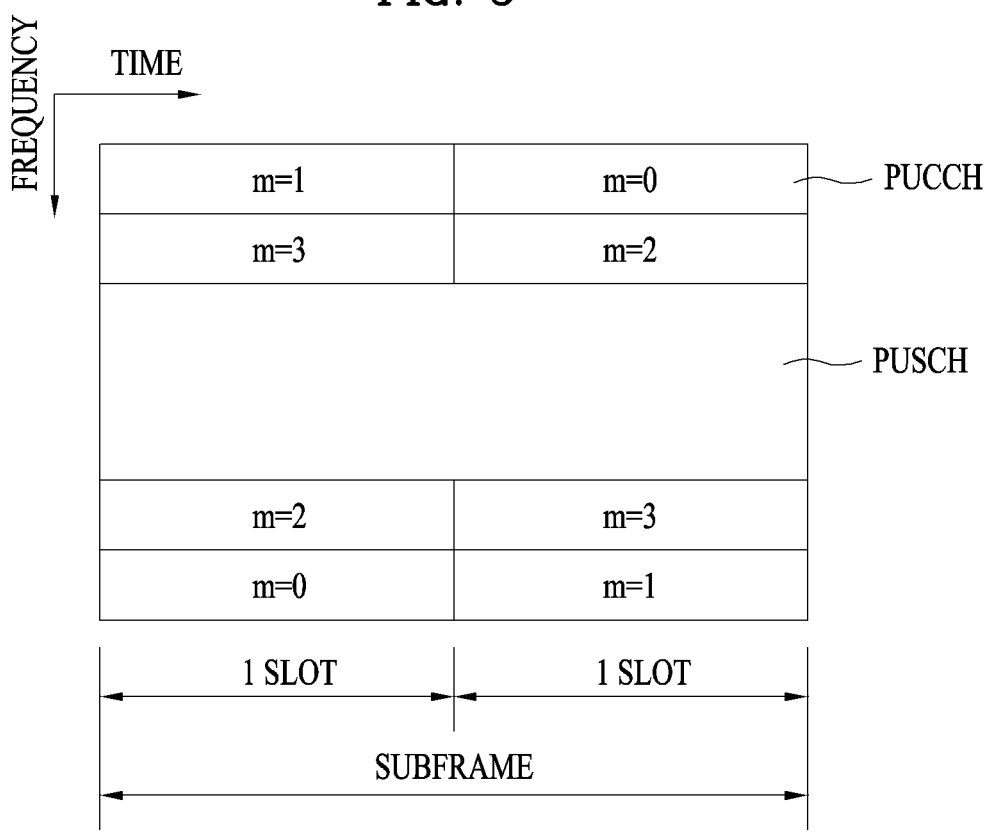
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
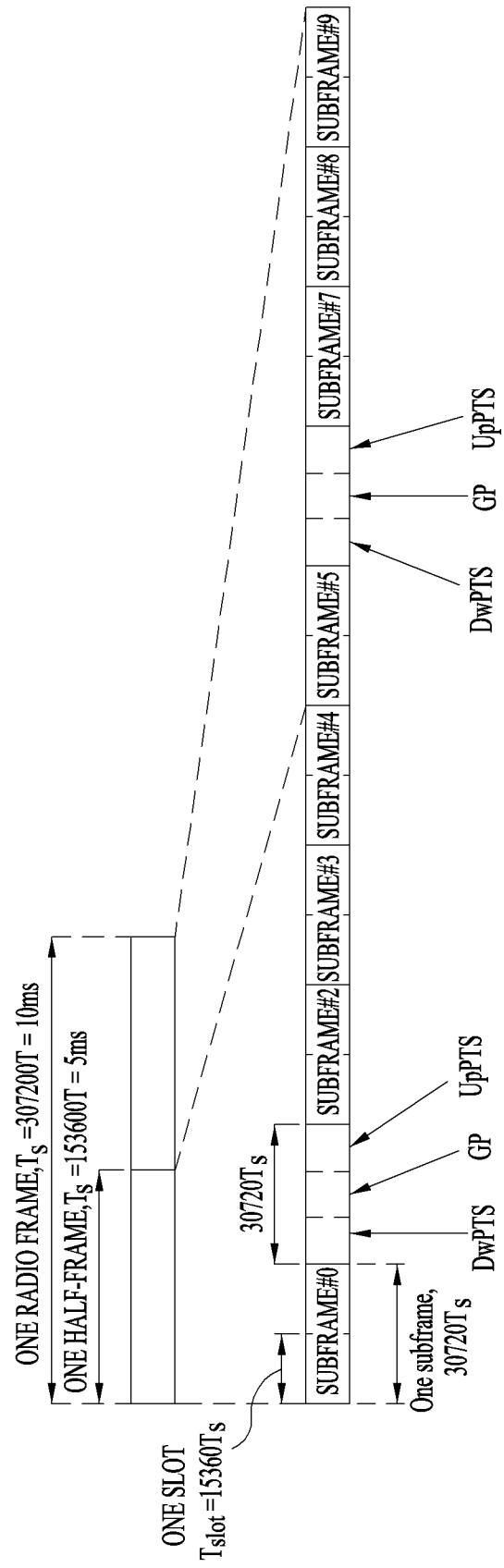
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 2 below.

TABLE 1

| Uplink-downlink configuration | Downlink-to-Uplink Switch-point periodicity | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |

TABLE 1-continued

| Uplink-downlink configuration | Downlink-to-Uplink Switch-point periodicity | subframe number | | | | | | | | | |
|---|---|---|---|---|---|---|---|---|---|---|---|
| | | 0 | 1 | 2 | 3 | 4 | 5 | 6 | 7 | 8 | 9 |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Hereinafter, a reference signal will be described in more detail.

Generally, to measure a channel, a Reference Signal (RS) known to a transmitting side and a receiving side is transmitted together with data from the transmitting side to the receiving side. Such an RS serves to perform a demodulation process by indicating a modulation scheme as well as channel measurement. The RS is classified into a dedicated RS (DRS), i.e. a UE-specific RS, for a BS and a specific UE and a Common RS, i.e. Cell-Specific RS (CRS), for all UEs in a cell. The CRS includes an RS for reporting a measurement result for CQI/PMI/RI measured in a UE to a BS and this RS is referred to as a Channel State Information-RS (CSI-RS).

Figure 7:
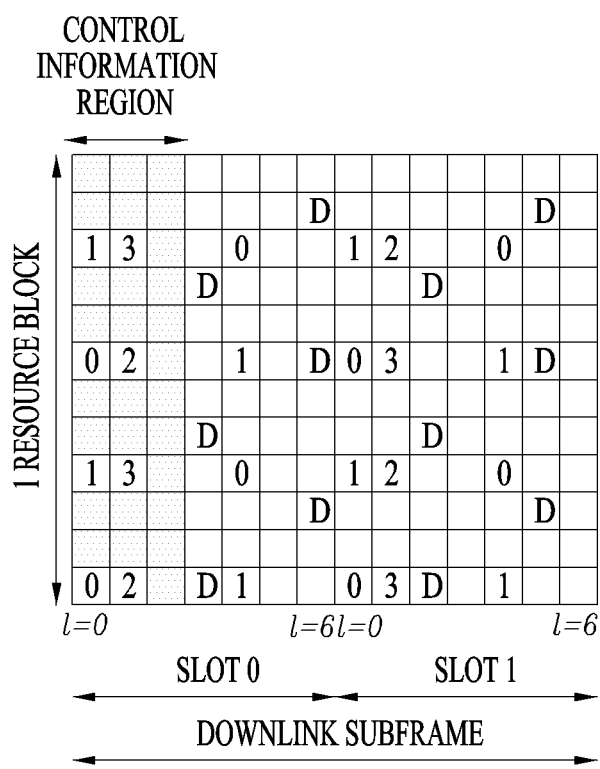
FIG. 7 and FIG. 8 are views illustrating the structure of downlink RSs in an LTE system supporting downlink transmission using four antennas.
Figure 8:
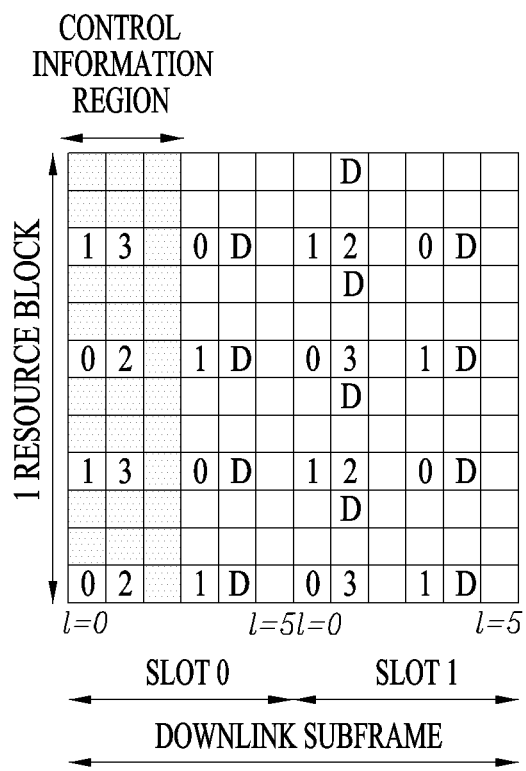

FIG. 7 and FIG. 8 are views illustrating the structure of RSs in an LTE system supporting downlink transmission using four antennas. Specifically, FIG. 7 illustrates the structure of the RS in a normal CP and FIG. 8 illustrates the structure of the RS in an extended CP.

Referring to FIGS. 7 and 8, numbers 0 to 3 denoted in lattices indicate CRSs, i.e. cell-specific RSs, transmitted for channel measurement and data demodulation in correspondence to antenna ports 0 to 3, respectively. The CRSs may be transmitted to the UE in all control information regions as well as in data information regions.

In addition, 'D's denoted in lattices indicate downlink Demodulation-RSs (DM-RSs) which are UE-specific RSs. The DM-RSs support transmission of a single antenna port through a data region, i.e. through a PDSCH. Whether or not the DM-RS, which is a UE-specific RS, is present is signaled to the UE through higher layers. In FIGS. 7 and 8, DM-RSs corresponding to an antenna port 5 are illustrated. In the 3GPP standard document 36.211, DM-RSs for a total of 8 antenna ports, from an antenna port 7 to an antenna port 14, are defined.

Figure 9:
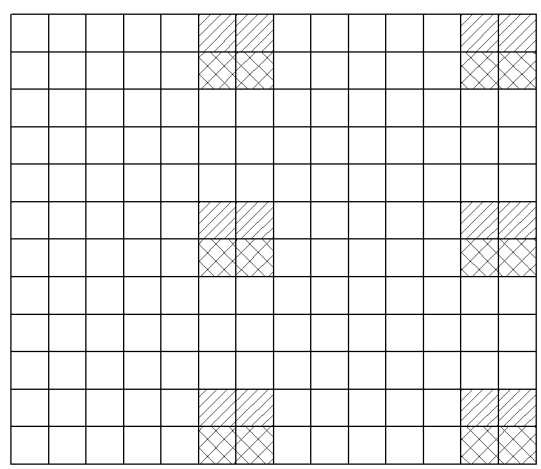
FIG. 9 illustrates an example of downlink DM-RS allocation defined in a current 3GPP standard document.
Figure 10:
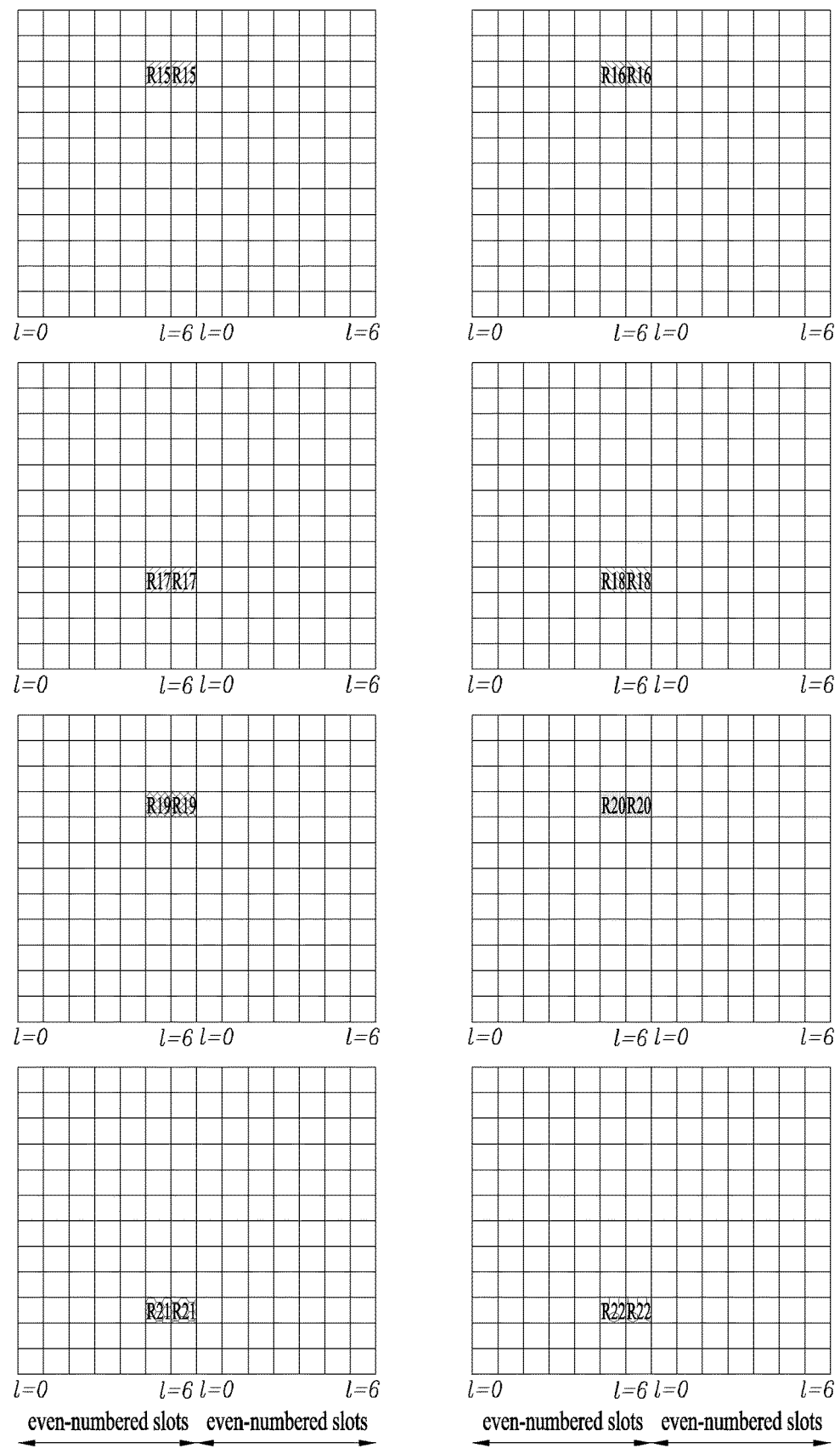
FIG. 10 illustrates CSI-RS configuration #0 in a normal CP among downlink CSI-RS configurations defined in the current 3GPP standard document.

FIG. 9 illustrates an example of downlink DM-RS allocation defined in the current 3GPP standard document.

Referring to FIG. 9, DM-RSs corresponding to antenna ports {#7, #8, #11, #13} are mapped using a sequence per antenna port in a DM-RS group 1. DM-RSs corresponding to antenna ports {#9, #10, #12, #14} are also mapped using a sequence per antenna port in a DM-RS group 2.

Meanwhile, the above-described CSI-RS has been proposed for the purpose of channel measurement for a PDSCH, separately from the CRS. Unlike the CRS, the CSI-RS may be defined as a maximum of 32 different CSI-RS configurations to reduce Inter-Cell Interference (ICI) in a multi-cell environment.

A CSI-RS configuration varies according to the number of antenna ports. CSI-RSs configured as differently as possible between neighboring cells are defined. The CSI-RS supports a maximum of 8 antennas unlike the CRS. In the 3GPP standard document, a total of 8 antennas, from an antenna port 15 to an antenna port 22, is allocated as antenna ports for the CSI-RS. The following Table 2 and Table 3 show CSI-RS configurations defined in the 3GPP standard document. Specially, Table 2 shows CSI-RS configurations in a normal CP and Table 3 shows CSI-RS configurations in an extended CP.

TABLE 2

| CSI reference signal config-uration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 3

| CSI reference signal config-uration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |

TABLE 3-continued

| | CSI reference signal config-uration | Number of CSI reference signals configured | | | | |
|---|---|---|---|---|---|---|
| | | 1 or 2 | | 4 | | 8 |
| | | (k', l') | $n_s$ mod 2 | (k', l') | $n_s$ mod 2 | (k', l') | $n_s$ mod 2 |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame | 16 | (11, 1) | 1 | (11, 1) | 1 | (11, 1) | 1 |
| structure | 17 | (10, 1) | 1 | (10, 1) | 1 | (10, 1) | 1 |
| type 2 | 18 | (9, 1) | 1 | (9, 1) | 1 | (9, 1) | 1 |
| only | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 12:
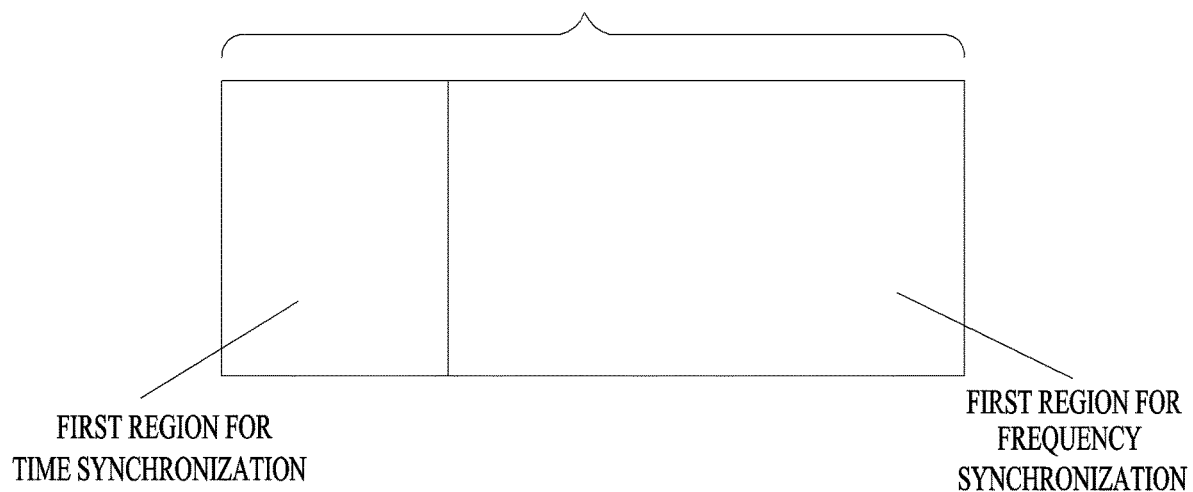
FIG. 12 is a diagram illustrating an example of a synchronization reference signal according to an embodiment of the present invention.

In Table 2 and Table 3, (k',l') denotes an RE index, k' denotes a subcarrier index, and l' denotes an OFDM symbol index. FIG. 12 illustrates CSI-RS configuration #0 in a normal CP among CSI-RS configurations defined in the current 3GPP standard document.

In addition, a CSI-RS subframe configuration may be defined. The CSI-RS subframe configuration is represented by a periodicity $T_{CSI-RS}$ and a subframe offset $\Delta_{CSI-RS}$, expressed in subframes. The following Table 4 indicates CSI-RS subframe configurations defined in the 3GPP standard document.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Meanwhile, information about a current zero-power (ZP) CSI-RS is configured through an RRC layer signal. In particular, a ZP CSI-RS resource configuration includes zeroTxPowerSubframeConfig and zeroTxPowerResourceConfigList corresponding to a bitmap having a size of 16 bits. Here, zeroTxPowerSubframeConfig indicates a period and a subframe offset in which the ZP CSI-RS is transmitted through a value of $I_{SCI-RS}$ corresponding to Table 3. In addition, zeroTxPowerResourceConfigList is information indicating a configuration of the ZP CSI-RS, and each element of the bitmap indicates configurations included in a column having four antenna ports for a CSI-RS in Table 1 or Table 2. A general CSI-RS other than the ZP CSI-RS is referred to as a non zero-power (NZP) CSI-RS.

Hereinafter, a synchronization signal will be described.

When power is turned ON or a UE attempts to access a new cell, the UE performs an initial cell search procedure to acquire time and frequency synchronization with the cell and detect a physical layer cell identity NcellID of the cell. To this end, the UE may be synchronized with an eNB by receiving a synchronization signal, for example, a primary synchronization signal (PSS) and a secondary synchronization signal (SSS) from the eNB, and the UE may acquire information such as a cell identifier, etc.

Specifically, the PSS is used as PSS d(n) by defining a Zadoff-Chu (ZC) sequence having a length of 63 in the frequency domain according to Equation 1 below to acquire time domain synchronization such as OFDM symbol synchronization, slot synchronization, etc. and/or frequency domain synchronization.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 1]}$$

In Equation 1, u denotes a ZC root sequence index. In the current LTE system, u is defined as in the following Table 5.

TABLE 5

| $N_{ID}^{(2)}$ | Root index u |
|---|---|
| 0 | 25 |
| 1 | 29 |
| 2 | 34 |

Next, the SSS is used to acquire frame synchronization, a cell group ID and/or a CP configuration of a cell (that is, use information of a normal CP or an extended CP), and configured by an interleaving combination of two binary sequences, each of which has a length of 31. In other words, an SSS sequence is d(0), . . . , d(61), and a total length thereof is 62. In addition, the SSS sequence is differently defined depending on whether the SSS sequence is transmitted in subframe #0 or transmitted in subframe #5 as in Equation 2 below. In Equation 2, n is an integer greater than or equal to 0 and less than or equal to 30.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 2]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

More specifically, the synchronization signal is transmitted in each of a first slot of subframe #0 and a first slot of subframe #5 based on 4.6 ms which is a global system for mobile communication (GSM) frame length for ease of inter-radio access technology (RAT) measurement. In particular, the PSS is transmitted on each of a last OFDM symbol of the first slot of subframe #0 and a last OFDM symbol of the first slot of subframe #5, and the SSS is transmitted on each of a second last OFDM symbol of the first slot of subframe #0 and a second last OFDM symbol of the first slot of subframe #5. A boundary of a radio frame may be detected through the SSS. The PSS is transmitted on a last OFDM symbol of the slot, and the SSS is transmitted on an OFDM symbol immediately before the PSS.

An SS may indicate a total of 504 unique physical layer cell IDs through a combination of three PSSs and 168 SSs. In other words, the physical layer cell IDs are grouped into 168 physical layer cell identifier groups, each of which includes three unique identifiers, such that each physical layer cell ID corresponds to a part of only one physical layer cell identifier group. Therefore, a physical layer cell identifier $N^{cell}_{ID}$ is uniquely defined by a number $N^{(1)}_{ID}$ within a range of 0 to 167 indicating the physical layer cell identifier groups and a number $N^{(2)}_{ID}$ within a range of 0 to 2 indicating the physical layer identifiers in the physical layer cell identifier groups. The UE may recognize one of three unique physical layer identifiers by detecting a PSS, and identify one of 168 physical layer cell IDs related to the unique physical layer identifier by detecting an SSS.

The PSS is transmitted every 5 ms, and thus the UE may determine that a subframe corresponds to one of subframe #0 and subframe #5 by detecting a PSS. However, the UE may not specify the subframe between subframe #0 and subframe #5. Therefore, the UE may not recognize a boundary of a radio frame only using the PSS. In other words, frame synchronization may not be acquired only using the PSS. The UE detects the boundary of the radio frame by detecting the SSS which is transmitted twice in one radio frame and transmitted as different sequences.

In this way, for cell search/re-search, the UE may be synchronized with an eNB by receiving a PSS and an SSS from the eNB and may acquire information such as a cell ID, etc. Thereafter, the UE may receive broadcast information in a cell managed by the eNB on a PBCH.

Figure 11:
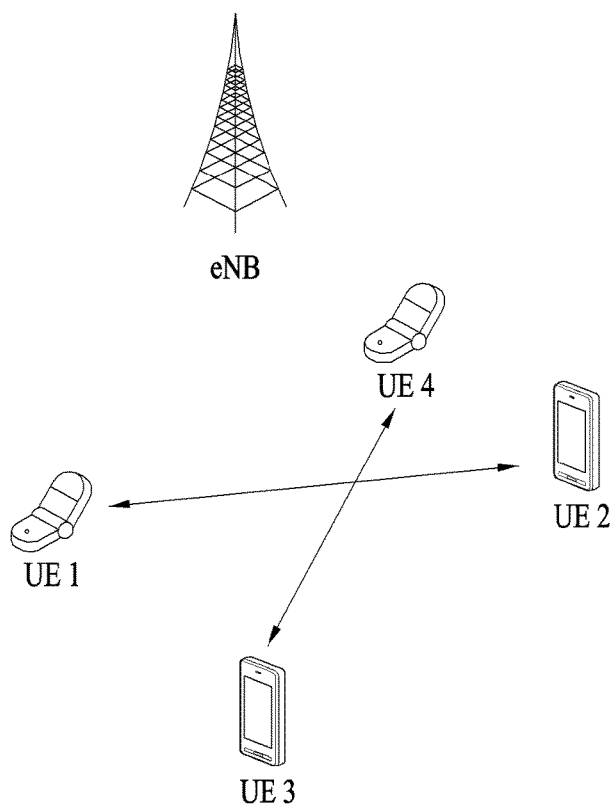
FIG. 11 is a diagram illustrating the concept of device-to-device (D2D) communication.

FIG. 11 illustrates a concept of direct communication between UEs.

Referring to FIG. 11, UE1 and UE2 perform direct communication therebetween, and UE3 and UE4 perform direct communication therebetween. An eNB may control a location of a time/frequency resource, transmission power, etc. for direct communication between UEs through an appropriate control signal. However, when UEs are positioned outside a coverage area of the eNB, direct communication between UEs may be configured to be performed without the control signal of the eNB. Hereinafter, direct communication between UEs will be referred to as device-to-device (D2D) communication.

To perform D2D communication, time and frequency synchronization needs to be acquired between two UEs. In general, when two UEs are in the coverage area of the eNB, the two UEs are synchronized with a PSS/SSS, a CRS, etc. transmitted by the eNB, and time/frequency synchronization may be maintained at a level at which a signal may be directly transmitted/received between the two UEs. However, a circumstance in which the two UEs need to directly communicate with each other may be presumed for urgent communication when the eNB is destroyed due to fire, etc. and thus the UEs are positioned outside the coverage area of the eNB. In this case, it is impossible to perform an operation of synchronizing with a signal of the eNB, and it is preferable that a particular UE transmit a synchronization reference signal corresponding to a reference of time/frequency synchronization, another UE acquire synchronization based on the synchronization reference signal, and then direct communication between UEs be performed.

In this instance, the synchronization reference signal received by one UE may be used as a reference of time/frequency synchronization of a plurality of adjacent UEs. In particular, in transmission and reception of discovery signals for identifying a plurality of UEs by one UE, several UEs simultaneously participating in transmission and reception of discovery signals are synchronized with the same synchronization reference signal, and thus discovery signals transmitted from a plurality of UEs may be received without significant performance deterioration even when synchronization is performed once.

Hereinafter, the present invention proposes a configuration of a reference signal allowing efficient acquisition of time/frequency synchronization when a UE transmits a synchronization reference signal corresponding to a reference of synchronization of other UEs.

In general, there is difficulty in ensuring continuous transmission of a synchronization reference signal when the signal is transmitted by a UE unlike a signal of an eNB since it is preferable that one representative UE be selected based on a predetermined rule and an operation be performed such that the representative UE transmits the synchronization reference signal in a case of an outside of a coverage area excluding control of the eNB. In particular, a UE has mobility and a characteristic of finite usable power, and thus there are many difficulties in continuously transmitting a synchronization signal even when the UE is selected as the representative UE once. In addition, the representative UE needs to participate in direct transmission and reception of a signal between UEs, and there may be many limitations on continuous reference signal transmission performed simultaneously with signal transmission and reception for the representative UE. In this regard, it is preferable that, when the representative UE is selected once, a synchronization signal be transmitted using certain continuous time resources, an operation be performed such that other UEs are synchronized with the synchronization signal, and then transmission of the synchronization signal be suspended to switch the operation to an operation for transmitting and receiving a signal to be used for the UE.

For example, when the representative UE is selected once, a synchronization reference signal is transmitted during a certain period from a particular point in time, for example, a period of about 1 ms to 2 ms, and then transmission of the reference signal is suspended to perform an operation for transmitting and receiving a discovery or D2D communication signal between UEs. In this instance, a rule may be provided such that the UEs synchronized with the synchronization signal use time/frequency synchronization acquired from the reference signal when performing the operation for transmitting and receiving the discovery or D2D communication signal. However, when synchronization is acquired once, the synchronization may be invalid after a certain period of time. Therefore, after the certain period of time, for example, after a period of time of about 100 ms, an operation may be performed such that the representative UE retransmits the synchronization reference signal or a new representative UE is selected to newly transmit a synchronization reference signal.

As described in the foregoing, the synchronization reference signal transmitted by the UE needs to be designed to effectively acquire time and frequency synchronization within a relatively short period of time such as 1 ms to 2 ms. FIG. 12 illustrates an example of a configuration of a synchronization reference signal according to an embodiment of the present invention.

Referring to FIG. 12, it is effective to broadly divide the synchronization reference signal into two areas, and have a configuration in which time synchronization is acquired using a front portion (a first region in FIG. 12), and then frequency synchronization is acquired using a rear portion (a second region in FIG. 12) based on the acquired time synchronization. In general, acquisition of frequency synchronization is more difficult than acquisition of time synchronization particularly in an OFDM system such as an LTE system in which a length of a CP is relatively long while subcarrier spacing is relatively small. Therefore, the second region intended for acquisition of frequency synchronization preferably has a longer transmission time than that of the first region.

In this case, when a configuration of a signal used in the legacy LTE system is reused and transformed to be suitable for a communication condition between UEs, there is an advantage in that a synchronization operation may be performed on the inside and outside of the coverage area using the same or similar transmission and reception circuit. For example, the same signal as a PSS/SSS of the legacy LTE system may be transmitted in the first region used for acquisition of time synchronization. In other words, the UE may determine whether the PSS/SSS is detected while continuously observing a received signal in the time domain. When the PSS/SSS is detected, the UE may verify a start and an end of the time domain corresponding to one OFDM symbol based on a predetermined configuration of the synchronization reference signal. In this way, the PSS and the SSS (or transformed signals of the PSS and the SSS) transmitted for D2D communication may be referred to as a primary D2D synchronization signal (PD2DSS) and a secondary D2D synchronization signal (SD2DSS), respectively.

In the legacy LTE system, a sequence used in the PSS/SSS is determined based on a cell ID. However, when the UE transmits the PSS/SSS in the first region, an operation may be performed such that a cell ID fixed in advance is used or one of cell IDs in a certain region is stochastically selected. In particular, when the UE is inside the coverage area of the eNB and the reference signal is transmitted for D2D communication between the UE and a UE outside the coverage area, the eNB may indicate a value corresponding to a cell ID to be used for the PSS/SSS in the first region. Alternatively, certain information may be included in a cell ID to be used for generation of a sequence of the PSS/SSS in the first region. For example, it is possible to include information such as maximum transmission power to be used in D2D communication, a bandwidth to be used in D2D communication, information about whether the UE performing transmission is currently inside the coverage area of the eNB, a used duplex mode when the UE is inside the coverage area, etc.

In particular, when the UE transmitting the synchronization reference signal is outside a coverage area of a cell, a case in which the cell operates using an FDD scheme and a case in which the cell operates using a TDD scheme may be matched with different cell IDs in advance. In this case, when a particular UE detects a synchronization reference signal based on a PSS/SSS using a particular cell ID, information used by the UE transmitting the synchronization reference signal may be allowed to be acquired.

In addition, in a TDD system, an operation may be performed such that a PSS/SSS is formed using a different cell ID according to uplink/downlink subframe configuration, thereby allowing the UE outside the coverage area to verify a point in time at which the UE transmitting the reference signal receives a downlink signal of the eNB and protecting reception of the downlink signal by the UE transmitting the reference signal at the point in time (for example, by reducing D2D transmission power).

Alternatively, when a PSS/SSS previously transmissible by the eNB is transmitted, a transformed signal of the existing PSS/SSS may be transmitted in the first region to prevent UEs detecting the PSS/SSS from determining that a cell is present based on the synchronization reference signal of the UE and performing an unnecessary initial access operation based on determination. For example, a sequence not used in the legacy LTE system may be used while maintaining the same transmission resource of the PSS/SSS.

As a specific example thereof, it is possible to use a sequence generated from a number other than a cell ID region used in the legacy LTE system.

More specifically, in the legacy LTE system, a PSS/SSS is formed using 504 cell IDs in total from cell ID 0 to cell ID 503 as described above. Therefore, when a configuration of the PSS/SSS is reused in the synchronization reference signal for D2D communication, an operation may be performed such that a sequence of the PSS/SSS is formed based on a number other than the 504 cell IDs in order to distinguish the configuration from an existing cell formed by the eNB. The sequence formation number used at this time may be fixed to a particular number, or an operation may be performed such that one number is stochastically selected as the sequence formation number from a certain range (for example, a range which is not present between 0 and 503). Alternatively, as described in the foregoing, it is possible to use a number linked to information to be delivered in order to deliver various information. Additionally, in order to configure a synchronization signal sequence of the UE as a sequence not used in the legacy LTE system, Equation 1 may be used as a sequence generation equation as before, and a value different from that of Table 5 may be used as a ZC root index determined by the sequence formation number.

Figure 13:
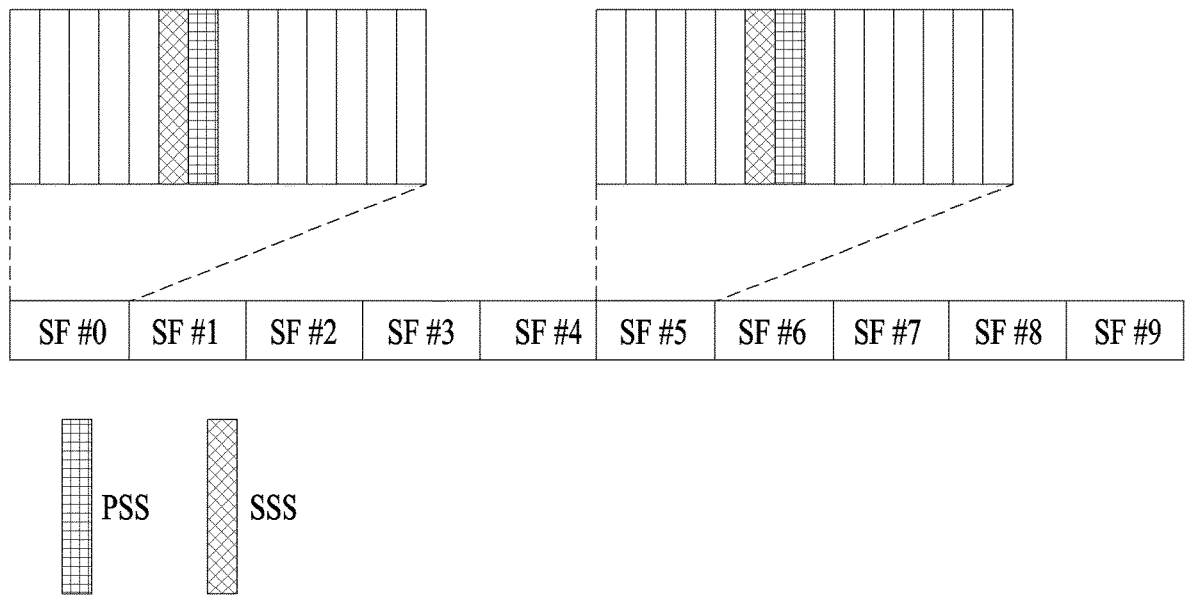
FIG. 13 is a diagram illustrating positions of resources in which a PSS and an SSS are transmitted in an LTE system having a normal CP length of a frequency division duplex (FDD) scheme.

As another example of distinguishing a PSS/SSS from the PSS/SSS transmitted by the eNB, a transmission position of the PSS/SSS may be changed when the configuration of the PSS/SSS is reused in the synchronization reference signal transmitted by the UE for communication between UEs. FIG. 13 illustrates positions of resources in which the PSS and the SSS are transmitted in the LTE system corresponding to a normal CP length of the FDD scheme. In the present patent application, a description is given of an example of changing a transmission position of the PSS/SSS based on FIG. 13.

Figure 14:
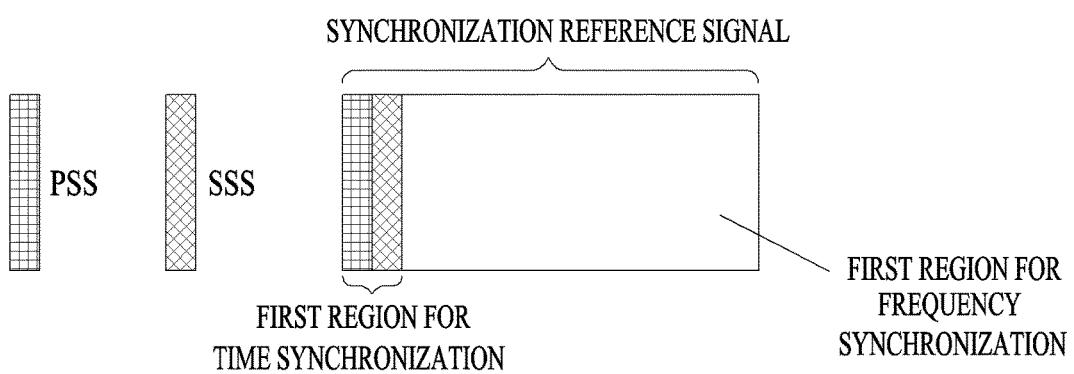
FIGS. 14 and 15 are diagrams illustrating examples of changing a transmission position of a PSS/SSS to distinguish the PSS/SSS from a general PSS/SSS transmitted by an eNB according to embodiments of the present invention.
Figure 15:
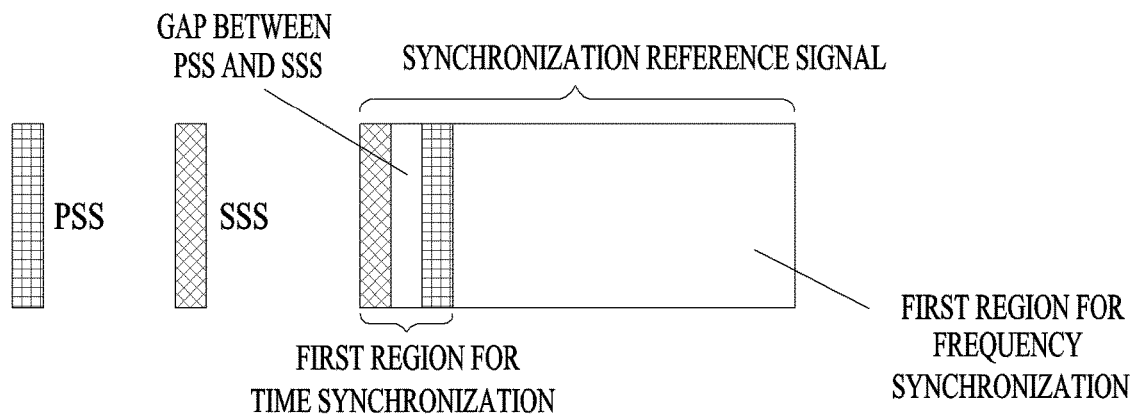

FIGS. 14 and 15 illustrate examples of changing a transmission position of a PSS/SSS to distinguish the PSS/SSS from a general PSS/SSS transmitted by the eNB according to an embodiment of the present invention.

Referring to FIG. 14, it can be understood that an operation is performed such that relative positions of the PSS/SSS are changed in the first region of the synchronization reference signal. In addition, as in FIG. 15, a gap between the PSS and the SSS for D2D communication may be configured to be different from that of the general PSS/SSS transmitted by the eNB. In particular, in FIG. 15, a certain gap is configured between the PSS and the SSS, and thus a difference from transmission of the general PSS/SSS by the eNB is generated. Therefore, a signal detecting UE may verify use of transmission of the PSS/SSS. In this way, a UE detecting the PSS/SSS may verify whether the PSS/SSS is transmitted from the eNB or transmitted from the UE.

Furthermore, a D2D synchronization reference signal transmitted in the first region by the UE may have a form transformed from a PSS/SSS used in the legacy LTE system in terms of a sequence or resource mapping. In this case, a cell ID may be regarded as a seed value that determines a sequence used by the PSS/SSS. The cell ID may be referred to as a synchronization reference ID considering that the cell ID functions as a reference of synchronization.

Meanwhile, upon acquisition of time synchronization through the first region, the UE may verify a start and an end of the time domain corresponding to one OFDM symbol, and process a received signal in the region to divide/process the signal in the frequency domain, thereby acquiring frequency synchronization. In the legacy LTE system, the UE acquires frequency synchronization based on a CRS transmitted by the eNB. Similarly, a signal having a similar configuration to that of the CRS may be transmitted in the second region to reuse a frequency synchronization circuit as much as possible. Examples below correspond to a case of the normal CP length, and the same principle may be applied to a case of an extended CP length.

Figure 16:
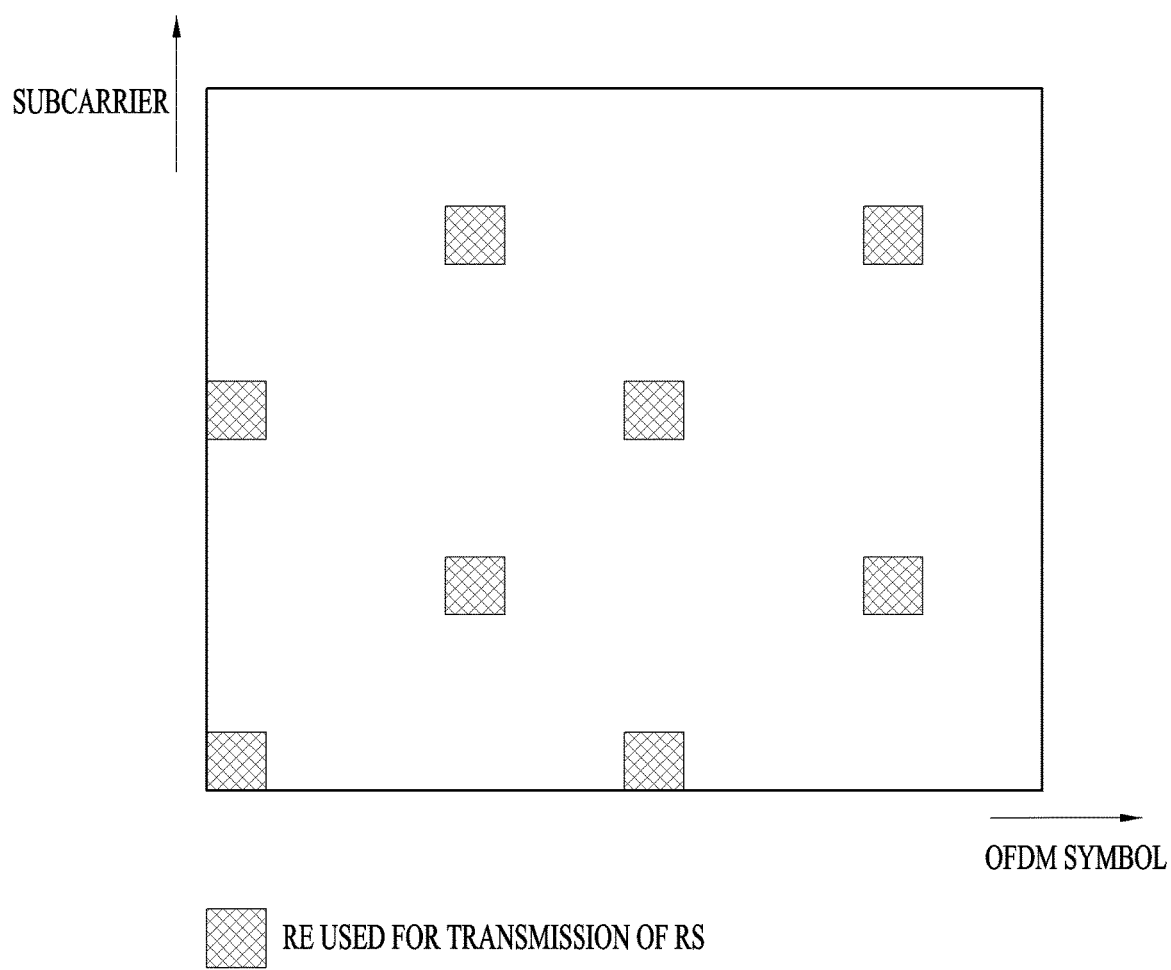
FIG. 16 is a diagram illustrating CRS transmission REs in the legacy LTE system.

FIG. 16 illustrates CRS transmission REs in the legacy LTE system. Referring to this figure, the same signal as an existing CRS (antenna port 0 is presumed) may be transmitted in the second region. In particular, a process of acquiring frequency synchronization from a configuration in which no signal is transmitted between RSs while using a configuration of an RS transmitted on subcarriers spaced apart by constant subcarrier intervals as a CRS of the LTE system has a characteristic in which interference between subcarriers due to a frequency error is initially small. As a result, there is an advantage in that stable frequency synchronization may be acquired.

However, when a configuration of the CRS used in the LTE system is used without change, a resource is wasted since no signal can be transmitted on an OFDM symbol which is used for transmission of a PDSCH by the eNB in the legacy LTE system.

The resource may not be wasted by additionally transmitting a reference signal on the OFDM symbol. In particular, additional transmission of the reference signal has an advantage in that UEs are enabled to more rapidly acquire synchronization.

FIGS. 17 to 20 illustrate examples of transmitting a reference signal in the second region to acquire frequency synchronization according to an embodiment of the present invention.

Figure 17:
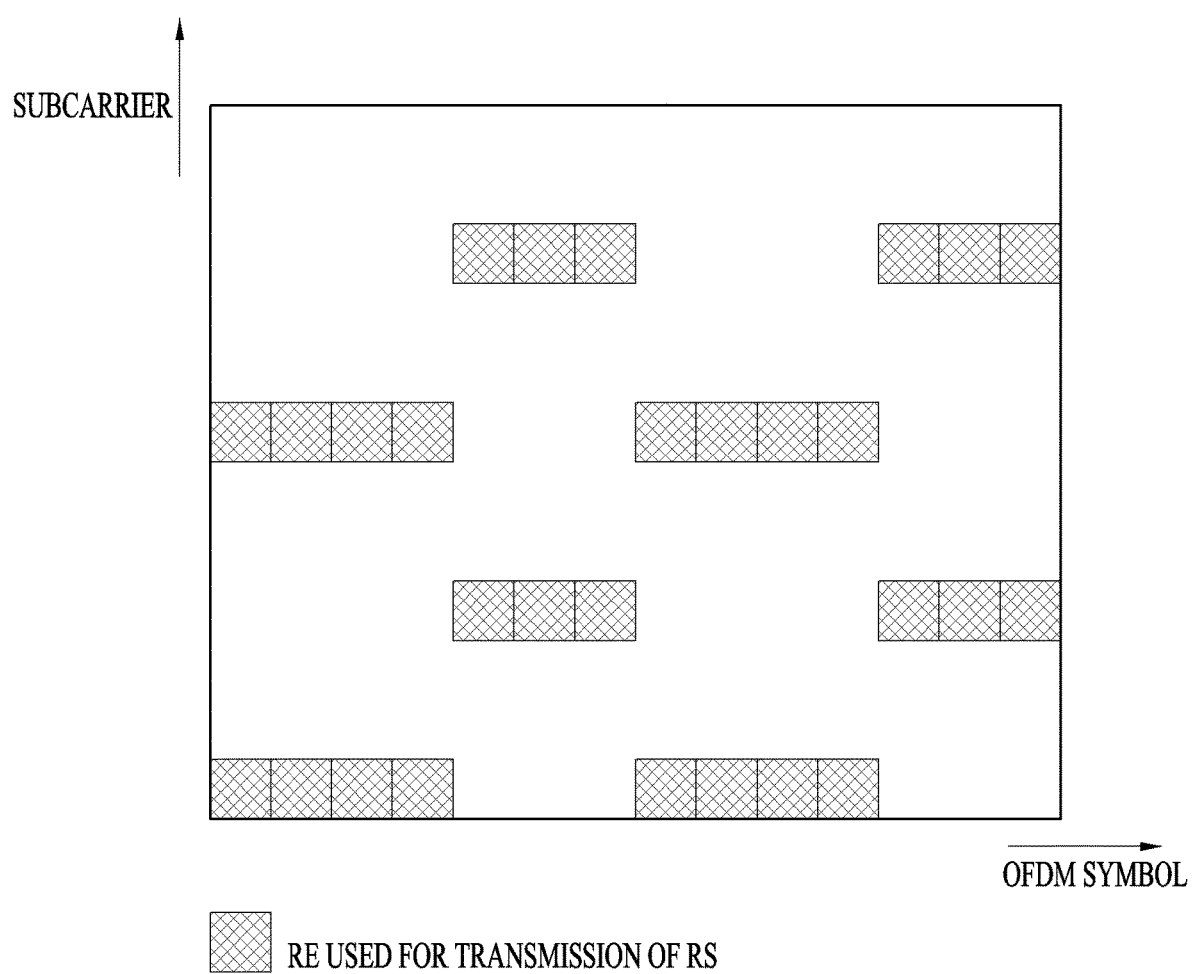
FIGS. 17 to 20 are diagrams illustrating examples of transmitting a reference signal in a second region to acquire frequency synchronization according to embodiments of the present invention.

First, FIG. 17 illustrates an example of additionally transmitting the reference signal in the configuration of FIG. 16, that is, in an existing CRS transmission pattern, and illustrates a configuration in which reference signals are continuously transmitted until a subsequent reference signal is transmitted on a subcarrier on which a reference signal is transmitted once. In particular, a configuration in which reference signals (preferably, reference signals having the same modulation symbol) are continuously transmitted on the same subcarrier assists in frequency synchronization since an error in frequency synchronization results in a phenomenon wherein a received signal has a phase rotating at a constant speed over time, and a reception UE may detect an error in frequency synchronization with respect to a transmission UE by observing phase changes of signals when the same signal is continuously transmitted in the same frequency.

Figure 18:
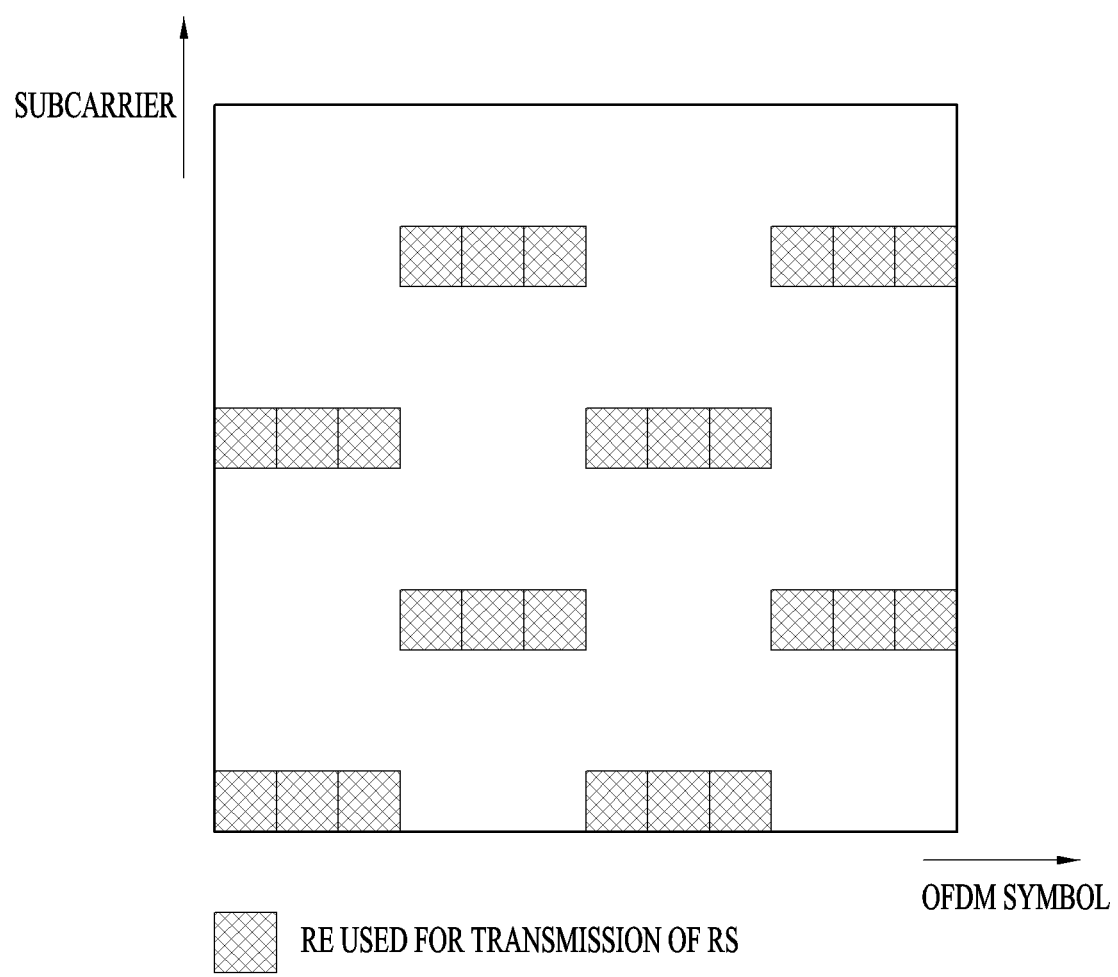

Next, FIG. 18 is a modified example of FIG. 17. FIG. 18 illustrates a scheme of decreasing or increasing the number of OFDM symbols for repeatedly transmitting a reference signal at the same subcarrier position when time resources available for the second region decrease or increase. In particular, FIG. 18 presumes a case in which a reference signal is transmitted on three OFDM symbols in one subcarrier.

FIGS. 17 and 18 presume that, as in a case of the CRS, when a reference signal is transmitted on a particular subcarrier, the reference signal is transmitted again on a subcarrier shifted from the subcarrier by three subcarriers after a certain point in time. However, the present invention is not limited thereto, and may be applied to a case in which the subcarrier is shifted by an arbitrary number of subcarriers.

Figure 19:
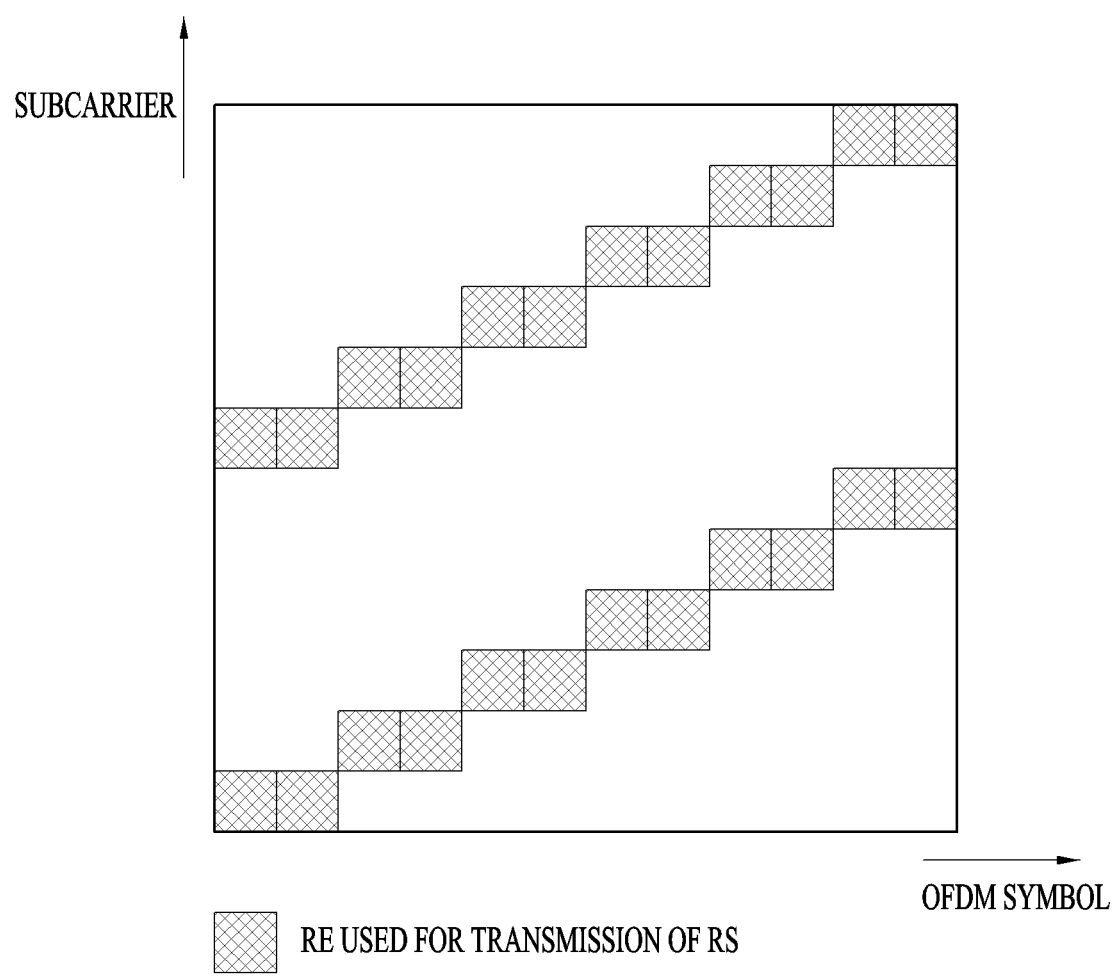
Figure 20:
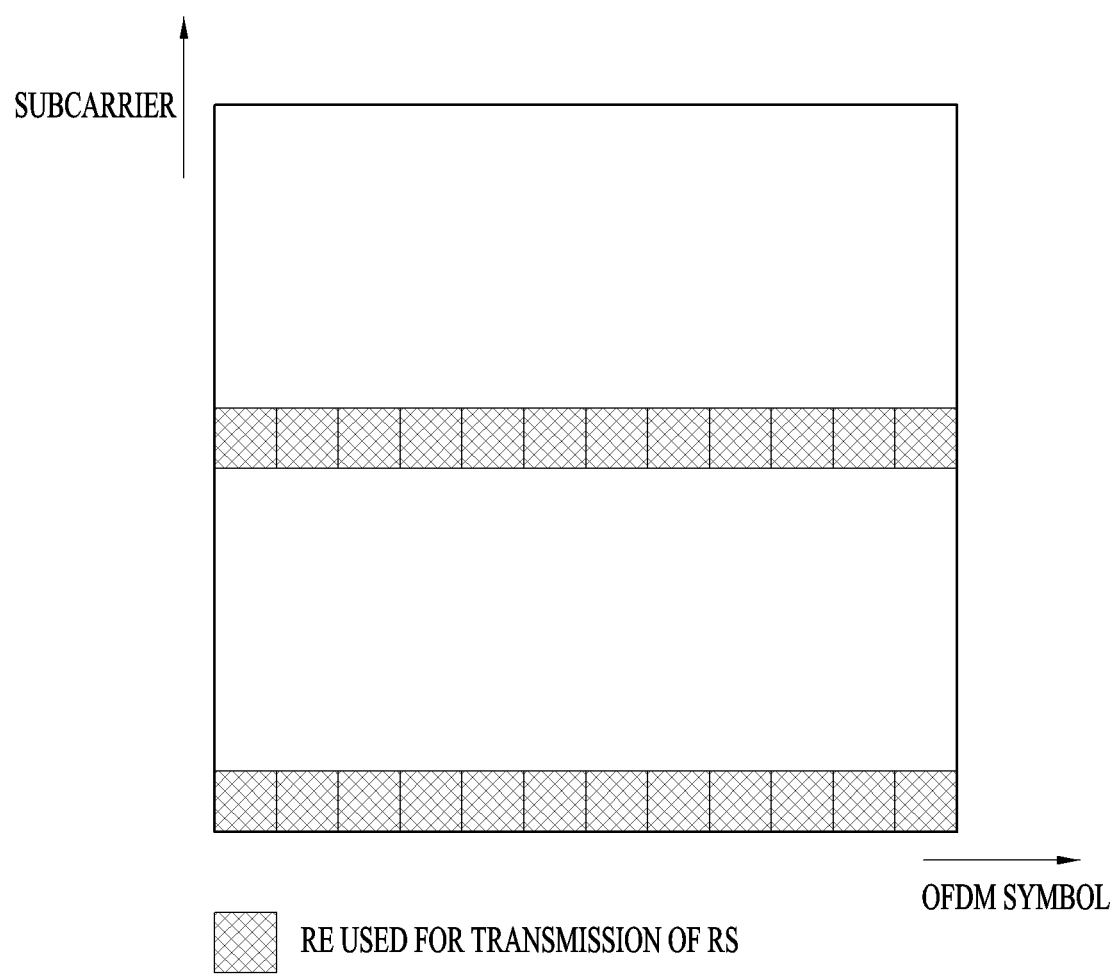

For example, as in FIG. 19, a reference signal may be transmitted twice on one subcarrier, and then a reference signal may be transmitted twice again by being shifted by one subcarrier. Alternatively, as in FIG. 20, when a difference in channel response within a certain subcarrier interval is sufficiently small to be ignored, an operation may be performed such that reference signals are continuously transmitted on one subcarrier.

Figure 21:
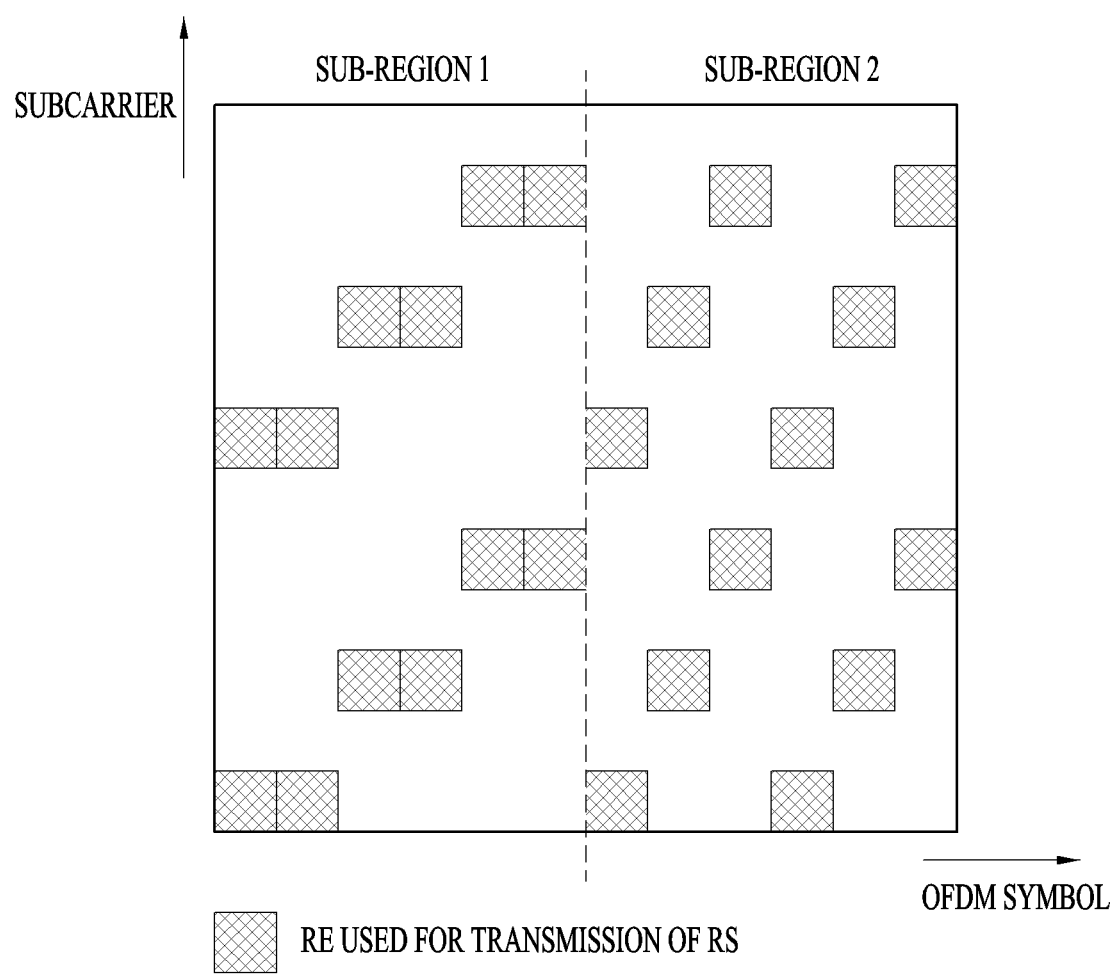
FIG. 21 is a diagram illustrating another example of transmitting the reference signal in the second region to acquire frequency synchronization according to an embodiment of the present invention.

FIG. 21 illustrates another example of transmitting a reference signal in the second region to acquire frequency synchronization according to an embodiment of the present invention.

Referring to FIG. 21, it can be understood that the second region is divided into two sub-regions again. An operation may be performed such that a great frequency error incurring fast phase change is corrected by transmitting signals on the same subcarrier and on adjacent OFDM symbols in a first sub-region, and a small frequency error incurring slow phase change is additionally corrected by applying frequency dimension processing adjusted based on the correction to a second sub-region in which signals are transmitted on the same subcarrier and on OFDM symbols spaced far apart.

This principle is generalized below. The second region, in which a reference signal is transmitted for frequency synchronization, is divided into a plurality of sub-regions. Then, in a preceding sub-region, a great frequency error incurring fast phase change is corrected by setting a time interval between reference signals transmitted on the same subframe to a small value. On the other hand, in a subsequent sub-region, a small frequency error incurring slow phase change is corrected by setting a time interval between reference signals transmitted on the same subframe to a large value.

Figure 22:
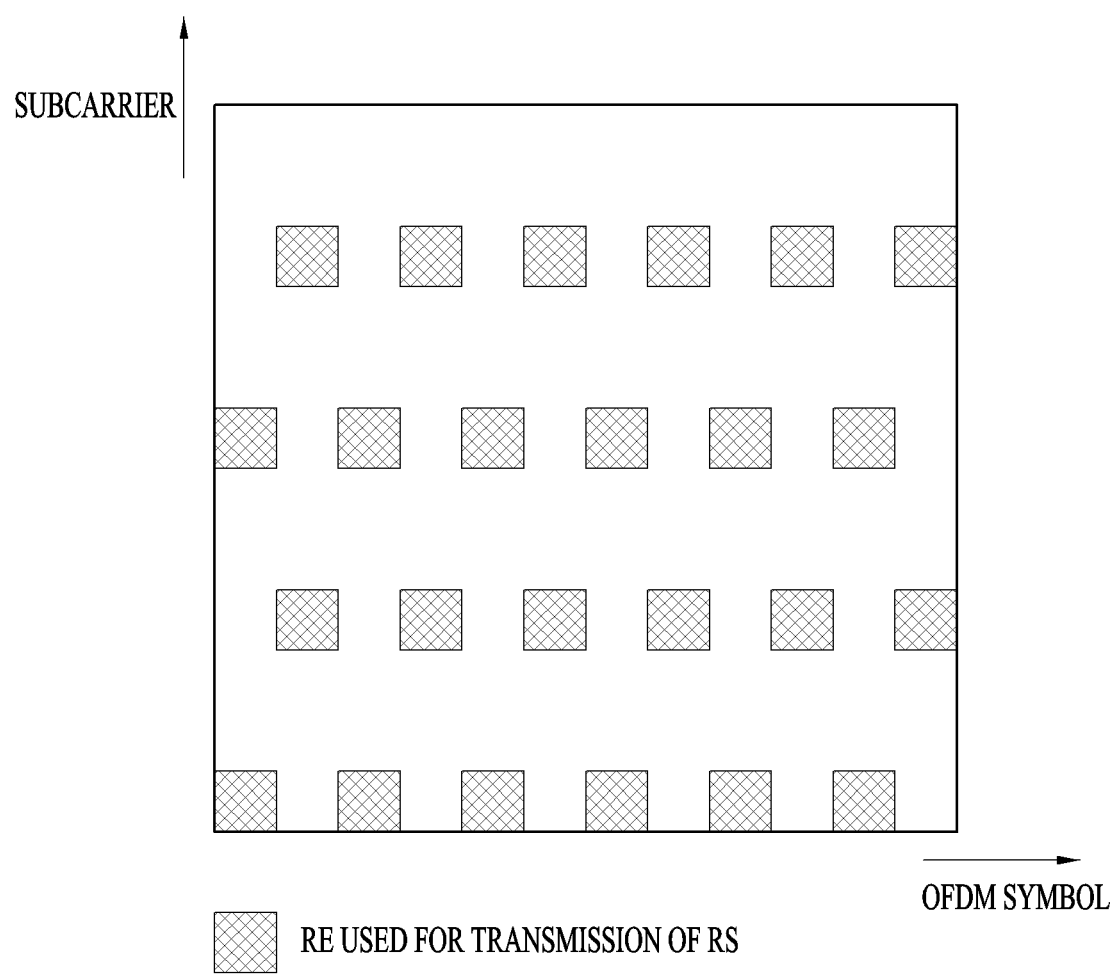
FIGS. 22 and 23 are diagrams illustrating other examples of transmitting the reference signal in the second region to acquire frequency synchronization according to embodiments of the present invention.
Figure 23:
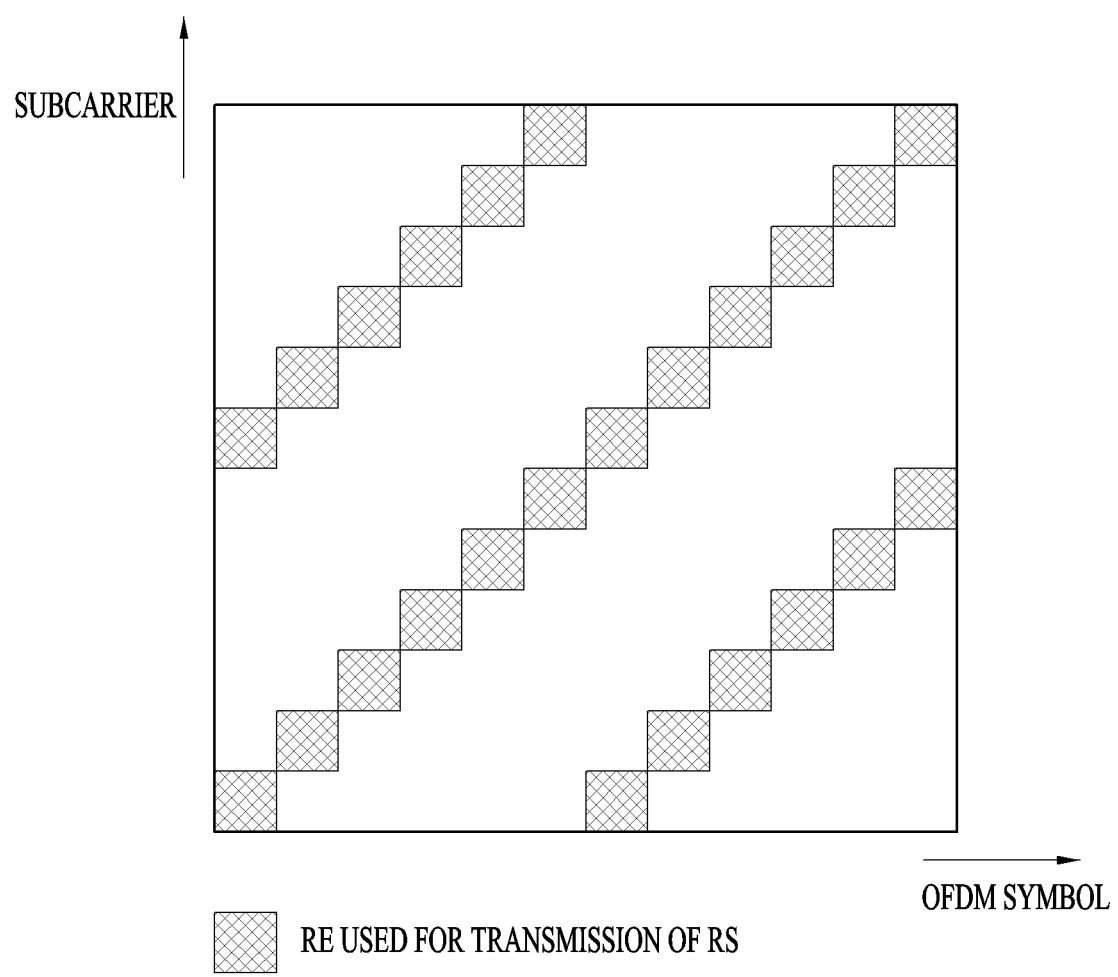

FIGS. 22 and 23 illustrate other examples of transmitting a reference signal in the second region to acquire frequency synchronization according to an embodiment of the present invention.

First, FIG. 22 illustrates a configuration in which only a reference signal symbol is extracted and transmitted by omitting transmission of an OFDM symbol on which no reference signal is transmitted while maintaining the reference signal transmission configuration illustrated in FIG. 16. The number of OFDM symbols used for reference signal transmission may be increased as necessary. FIG. 22 corresponds to a case in which twelve OFDM symbols in total are transmitted. The case is effective in transmitting reference signals, the number of which corresponds to CRSs transmitted during three subframes.

FIG. 23 illustrates an example in which a reference signal is allowed to be transmitted on more various subcarriers by shifting a subcarrier on which a reference signal is transmitted for each OFDM symbol while maintaining a CRS configuration in which reference signals transmitted on one OFDM symbol are disposed at an interval of six subcarriers.

Meanwhile, when a synchronization signal having the configuration of FIG. 12 appears unexpectedly in a state in which there is no signal, reception UEs experience a radical difference in received power. In this instance, there is a possibility that acquisition of the synchronization signal fails due to loss of some signals in a process of compensating for the power difference. A scheme of preventing the possibility will be described with reference to FIG. 24.

Figure 24:
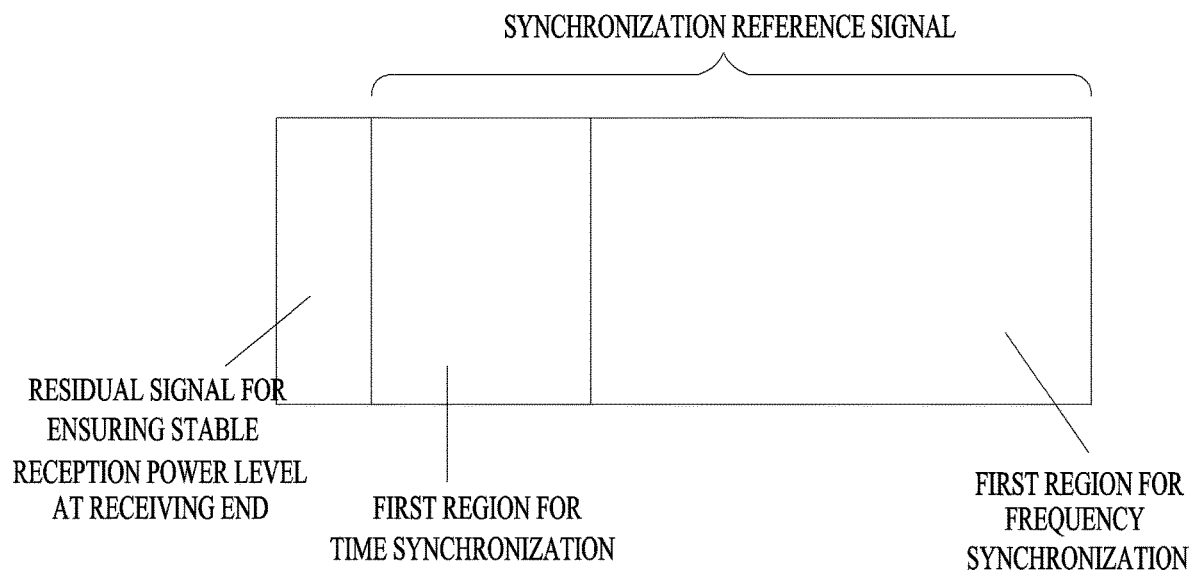
FIG. 24 is a diagram illustrating another configuration of the synchronization reference signal according to an embodiment of the present invention.

FIG. 24 illustrates another configuration of a synchronization reference signal according to an embodiment of the present invention. In FIG. 24, reception UEs are allowed to obtain information about a level of received power of a synchronization signal in advance by transmitting a certain signal (preferably a signal having power of the same level as that of a subsequent synchronization signal) during a certain period of time immediately before a synchronization signal as in FIG. 12 of the present invention is transmitted. In particular, the additional signal may not be correctly decoded by the reception UEs in many cases, and thus may have a form of an arbitrary signal not conveying separate information.

Figure 25:
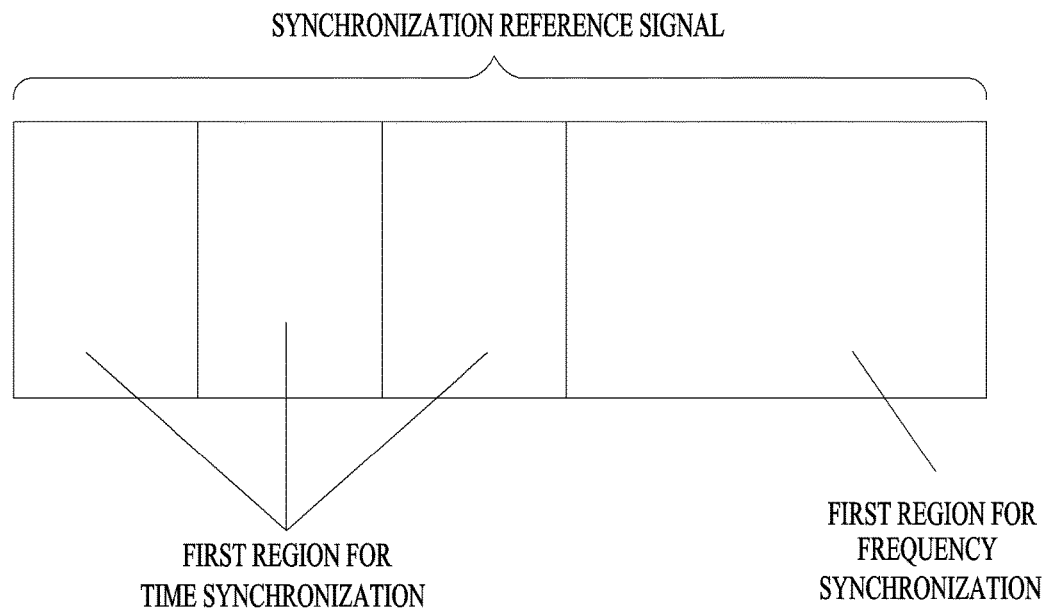
FIG. 25 is a diagram illustrating an example of repeatedly transmitting a synchronization reference signal for D2D communication according to an embodiment of the present invention.

Alternatively, a signal transmitted in the first region, for example, a transformed signal of the PSS/SSS of the legacy LTE system may be repeated several times as in FIG. 25. FIG. 25 illustrates an example in which a synchronization reference signal for D2D communication is repeatedly transmitted according to an embodiment of the present invention. In particular, FIG. 25 illustrates a configuration in which a signal of the first region is repeated three times.

In this case, even when some initial signals are missed, a reception UE may operate to acquire time synchronization from repeated signals, wait for a signal of the second region, and recognize an end of the first region when the signal of the second region is detected. When the PSS/SSS of the LTE system is transmitted in the first region, the same sequence may be repeatedly transmitted. However, to prevent a case in which the same particular sequence is selected by several UEs and repeatedly transmitted, a sequence may be changed for each of repeated transmissions according to a predetermined rule.

For example, an operation may be performed such that, when a particular cell ID is selected in initial transmission, a value obtained by adding a certain number thereto is regarded as a cell ID in subsequent repetition to generate a sequence. It is clear that a modulo operation may be additionally provided such that a value obtained by adding a certain number is within a certain range.

Characteristically, to use a signal of the first region as an indicator of a start of the second region together with the end of the first region, a last signal among repeated signals of the first region may be fixed such that a particular sequence is used.

FIG. 25 corresponds to a case in which a total transmission time of signals of the first region is longer than that of a signal of the second region due to three repetitions of the first region. However, transmission times of the signals of the first region and the second region are not limited thereto. In particular, even when signals of the first region are repeated for the above-described reason, it is possible to allow the signal of the second region to be transmitted during a longer period of time.

Figure 26:
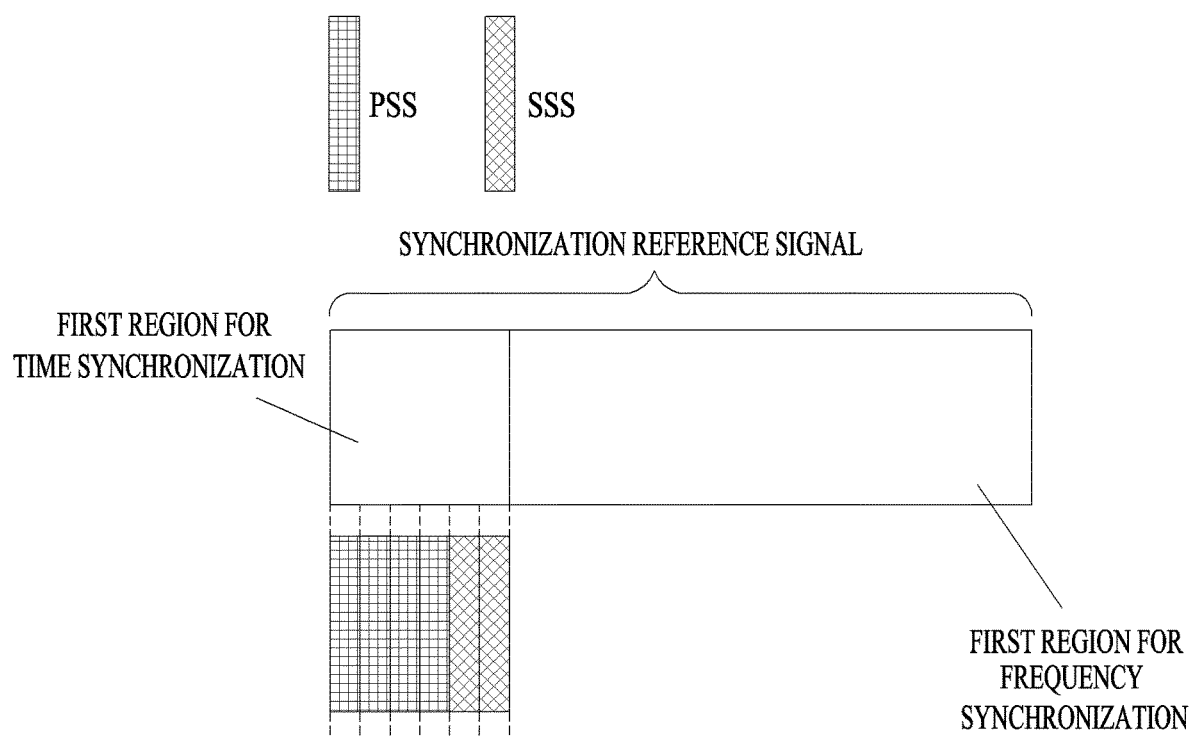
FIG. 26 is a diagram illustrating another example of repeatedly transmitting the synchronization reference signal for D2D communication according to an embodiment of the present invention.

As another scheme of repeating the PSS/SSS in the first region, each of the PSS and the SSS may be repeated certain times in the first region as in FIG. 26. FIG. 26 illustrates another example of repeatedly transmitting a synchronization reference signal for D2D communication according to an embodiment of the present invention. In particular, FIG. 26 presumes a case in which the PSS and the SSS are repeated four times and two times, respectively.

In the example of FIG. 26, six symbols used as the PSS and the SSS may be symbols belonging to one slot of a normal CP including seven symbols. Characteristically, the six symbols may correspond to the seven symbols in the one slot except for a first symbol. The first symbol is excluded to prevent a problem that may occur in the first symbol when an operation of a UE transmitting the signal overlaps a transmission and reception operation in a previous subframe.

If the PSS is repeated several times in the first region, even when some signals are missed, a UE may be allowed to acquire time synchronization through remaining PSSs. Then, the UE may confirm time synchronization acquired by the UE based on the repeated SSSs to recognize the end of the first region. In addition, it is possible to verify whether a cell ID detected by the UE (that is, a seed value of a sequence) is correct.

Characteristically, the SSS is mainly used to verify information such as time synchronization, etc. detected by the PSS, and thus may be repeated a smaller number of times than the PSS.

In particular, the signal configuration illustrated in FIG. 26 may be useful when each of a plurality of UEs synchronized with the same cell is desired to exchange a D2D signal with a UE positioned outside the cell. In a 3GPP LTE structure, an operation is performed such that a series of cell IDs use PSSs of the same sequence. Therefore, in transmission of unique synchronization reference signals by a plurality of UEs, when cell IDs are allocated such that the same sequence is used for PSSs and different sequences are used for SSSs, the PSSs are transmitted together by a plurality of synchronization reference signal transmission UEs, and thus a reception UE may acquire time synchronization at a higher probability by combining energies thereof. Meanwhile, an individual reference signal transmission UE may be identified using a subsequent SSS.

Figure 27:
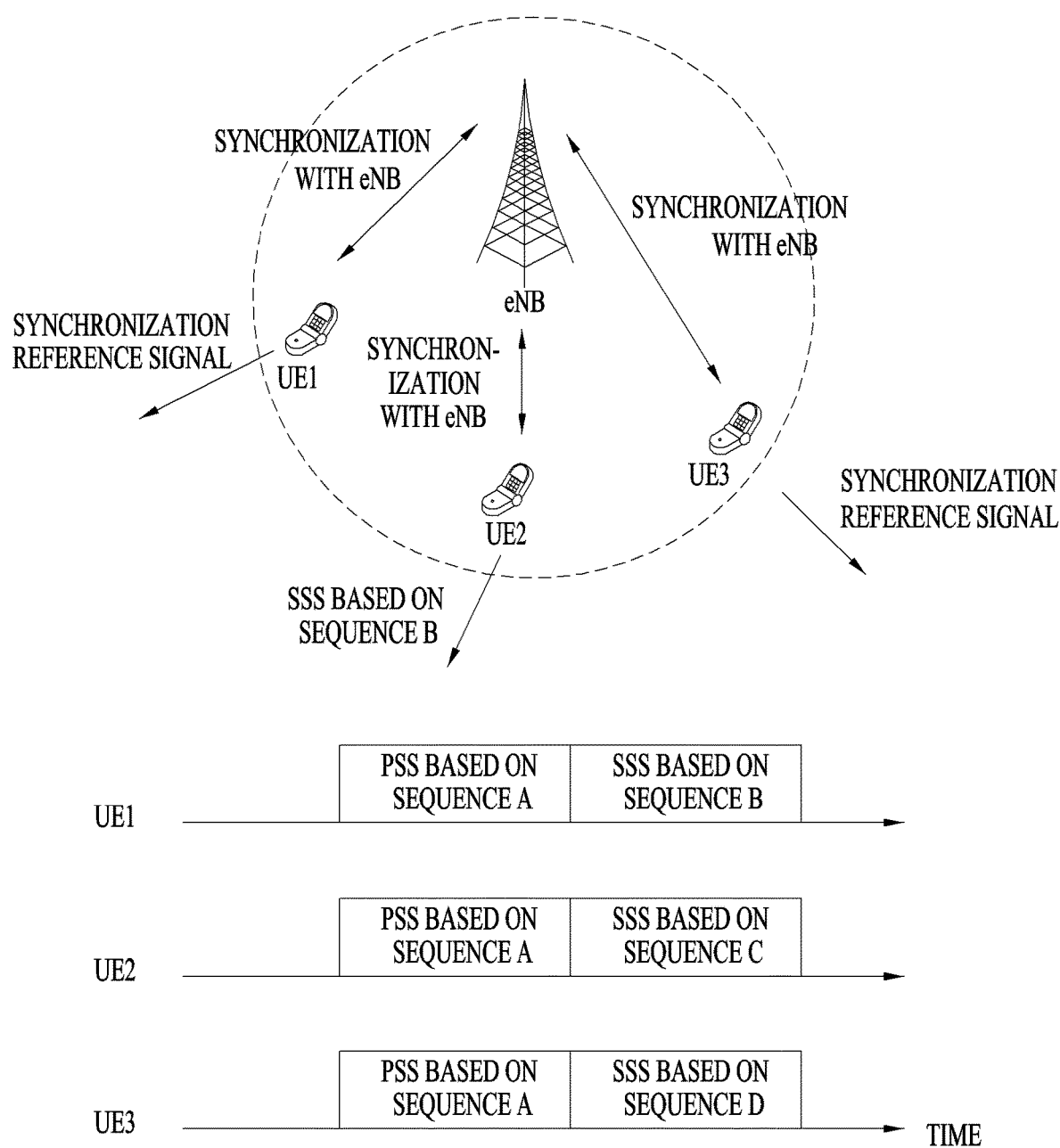
FIG. 27 is a diagram illustrating an example of transmitting a PSS based on the same sequence and transmitting an SSS based on different sequences according to an embodiment of the present invention.

FIG. 27 illustrates an example in which PSSs are transmitted based on the same sequence and SSSs are transmitted based on different sequences according to an embodiment of the present invention.

Referring to FIG. 27, it can be understood that three UEs are applied to the same cell to transmit reference signals in synchronization with the cell, and the same sequence is used for PSSs and different sequences are used for SSSs by allocating appropriate cell IDs. Here, even though it is presumed that the respective UEs transmit signals at the same point in time, a slight error may occur depending on a distance between each UE and the eNB, etc.

Characteristically, PSSs transmitted by UEs belonging to the same cell may be restricted to the same sequence as that of a PSS of the cell. In the 3GPP LTE system, when remainders obtained by dividing cell IDs by 3 are the same, the same PSS sequence is used. Thus, in this case, in a cell using a cell ID x, cell IDs used by UEs transmitting synchronization reference signals may satisfy a condition of x+3k. In this instance, an eNB may designate a value of k to be used by each UE, or each UE may randomly select a value of k.

The case may be generalized as below. In a reference cell of each UE transmitting a synchronization reference signal, when a cell ID x is instructed to be used (the cell ID x may be different from an ID of a reference cell) to generate a PSS of a synchronization reference signal, a cell ID used in an SSS by a UE transmitting the reference signal may be expressed in a form of x+3k.

In addition, a reception UE acquiring synchronization based on the PSS according to the above-described operation may accurately correct time synchronization of an individual UE transmitting a reference signal through the SSS, and then perform processing on the assumption that some or all parameters such as large-scale characteristics, for example, delay spread, Doppler spread, Doppler shift, average gain, average delay, etc. of a D2D signal transmitted by the individual reference signal transmission UE or UEs synchronized with the individual reference signal transmission UE are the same as a parameter acquired from the SSS.

In the above-described example, a signal belonging to the second region is an example of a signal transmitted by the transmission UE. According to this description, an operation may be performed such that the parameters are the same between a signal in the second region and an SSS in the first region. In addition, an operation may be performed such that the parameters are the same between the SSS and a discovery signal or a D2D communication signal transmitted by a synchronization signal transmission UE or UEs synchronized with the UE. Characteristically, in the configuration of FIG. 26, a set of UEs participating in transmission of one sequence is different between the PSS and SSS, and thus it is preferable to separately process the two signals considering that some or all of the above-described large-scale parameters may be different. This indicates that some of the large-scale parameters with respect to a signal transmitted in the second region by the reference signal transmission UE or other signals may be different from parameters of the PSS. In particular, some parameters corresponding to average delay and Doppler shift may be different between the PSS and other D2D signals due to a possibility that a plurality UEs may transmit the PSS together. There is a difference in that the PSS and the SSS transmitted by the eNB are regarded to share at least the same average delay and Doppler shift among the above-described parameters.

When a particular UE acquires more accurate synchronization than that of a UE transmitting the synchronization reference signal and performs D2D communication, additional correction with respect to the UE transmitting the synchronization reference signal through the above-described SSS is more effective. In particular, this operation is effective when the individual reference signal transmission UE is a relay UE that relays information exchange between the eNB and a UE positioned outside the coverage area of the eNB through communication with the UE positioned outside the coverage area since performance of communication with the relay UE is enhanced in the future through accurate synchronization with the relay UE.

On the other hand, for example, when the particular UE only performs a small amount of communication to verify whether an individual UE is present rather than exchanging a great amount of data with the relay UE, synchronization with the individual reference signal transmission UE is an unnecessary operation. Thus, only synchronization based on a PSS transmitted by several reference signal transmission UEs may be sufficient.

Further description will be given. An operation may be performed such that, while a signal is exchanged according to synchronization obtained by observing both a PSS and an SSS of a particular reference signal transmission UE when D2D communication is performed in earnest, synchronization is acquired using only a PSS transmitted by several reference signal transmission UEs together when D2D discovery using only a few resources is performed. To smoothly perform this operation, a UE transmitting an SSS may be restricted to the relay UE, and an operation may be performed such that a UE other than the relay UE, for example, a UE, which transmits a D2D discovery signal while not performing a relay operation, transmits only a portion corresponding to a PSS.

Figure 28:
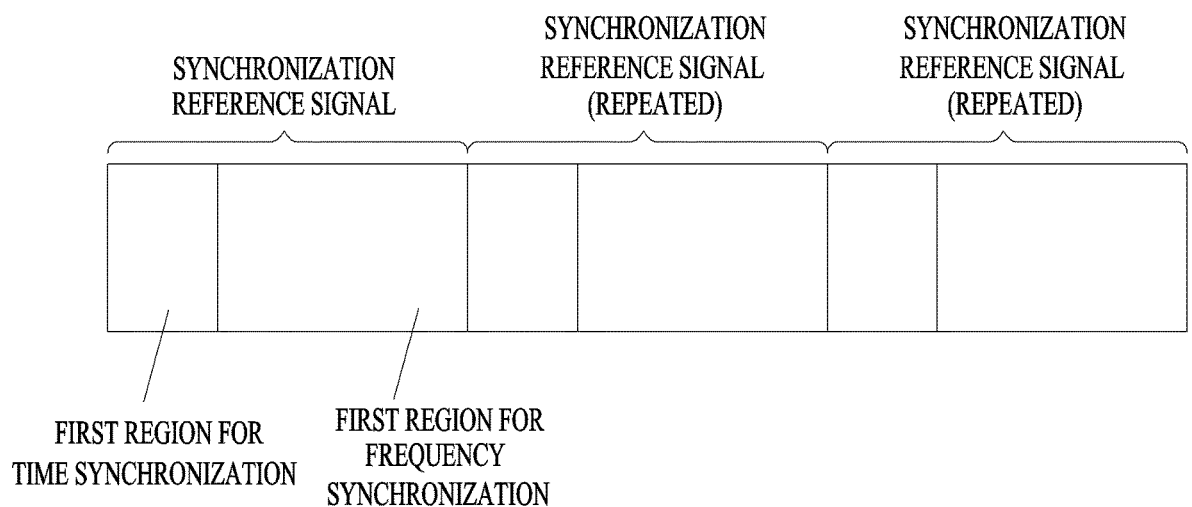
FIG. 28 is a diagram illustrating another example of repeatedly transmitting the synchronization reference signal for D2D communication according to an embodiment of the present invention.

Meanwhile, as described in the foregoing, in general, synchronization reference signals transmitted by the UE are intermittently transmitted at a relatively long interval, for example, an interval of 100 ms. Therefore, it is preferable to allow acquisition of synchronization at a significantly high probability when a transmission opportunity is provided once. To this end, it is possible to design a form in which the configuration of the synchronization reference signal described with reference to FIG. 12 is repeated several times. FIG. 28 illustrates another example of repeatedly transmitting a synchronization reference signal for D2D communication according to an embodiment of the present invention. FIG. 28 simply illustrates a configuration in which a synchronization reference signal is repeated three times, and corresponds to a configuration in which the first region and the second region repeatedly appear.

Figure 29:
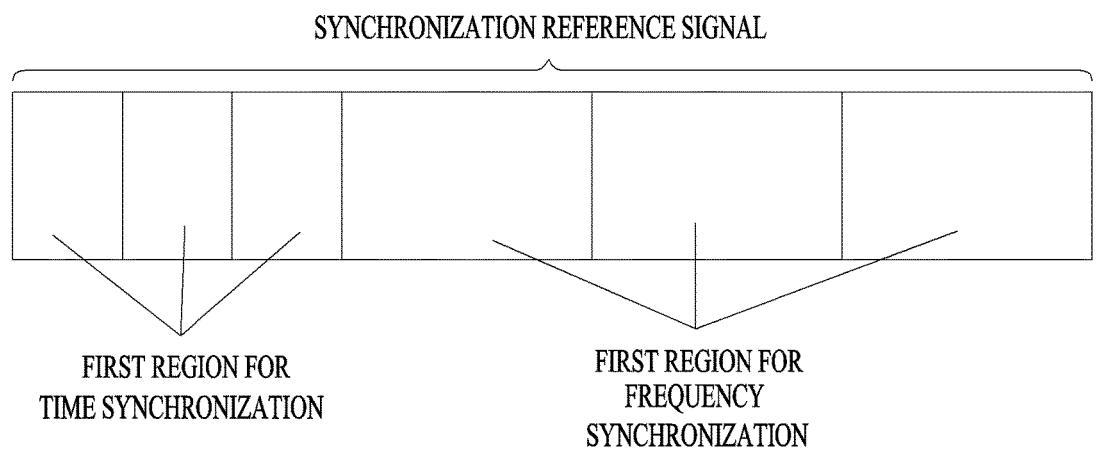
FIG. 29 is a diagram illustrating an example in which a first region and a second region are separately and repeatedly transmitted in the synchronization reference signal for D2D communication according to an embodiment of the present invention.

Alternatively, as an extension of a configuration as illustrated in FIG. 25, the second region may be repeated after the first region is repeated. FIG. 29 illustrates an example in which the first region and the second region are separately repeated and transmitted in the synchronization reference signal for D2D communication according to an embodiment of the present invention. In particular, although FIG. 29 illustrates a configuration in which each region is repeated three times, the first region and the second region may be repeated different numbers of times. For example, when acquisition of frequency synchronization is more difficult than acquisition of time synchronization, the second region may be repeated a greater number of times.

When the second region is divided into a plurality of sub-regions as described with reference to FIG. 21, a second sub-region may be repeated after a first sub-region is repeated a predetermined number of times. The two sub-regions may be configured to be repeated the same number of times or different numbers of times.

When the first region, the PSS, or the SSS described above is repeated, repeated signals may use adjacent symbols. However, the present invention is not limited thereto, and the first region, the PSS, or the SSS may be repeated on discontinuous symbols.

Meanwhile, a separate time synchronization reference may be present before a UE, which transmits a D2D synchronization reference signal, transmits a synchronization reference signal, and a series of UEs may previously acquire time synchronization. As an example, UEs may receive time information from a device such as a satellite, and acquire time synchronization based on the time information. As another example, even when UEs cannot stably receive a control channel or a data channel from an eNB and cannot acquire sufficient frequency synchronization due to poor quality of a CRS, the UEs may be positioned in a region in which a PSS/SSS providing time synchronization can be detected. For example, the region may have a form in which a signal quality of a particular cell indicated by a signal-to-interference-plus-noise ratio (SINR) or a reference signal received quality (RSRQ) is greater than or equal to a first level corresponding to a minimum level at which the PSS/SSS can be detected and less than or equal to a second level corresponding to a minimum level at which stable channel reception and frequency synchronization are possible.

As another example, when a UE simultaneously performs communication in two frequency bands, a particular cell may be detected and connected in a first frequency band, and time synchronization of a cell detected in the first frequency band may be used for communication between UEs in a second frequency band when direct communication is performed between UEs while no cell is detected in the second frequency band.

When time synchronization is separately provided as described above, a signal of the first region is less needed. Thus, when a configuration as in FIGS. 28 and 29 is used, an operation may be performed such that the number of repetitions of the first region is reduced or transmission of the first region is omitted.

In this case, an operation of transmitting a synchronization reference signal by a UE may be restrictively matched with the separate time synchronization. In other words, a rule is provided such that the UE identifies a point in time at which the synchronization reference signal may be transmitted from the separate time synchronization, and is prohibited from transmitting the synchronization reference signal at a point in time other than the identified point in time.

Figure 30:
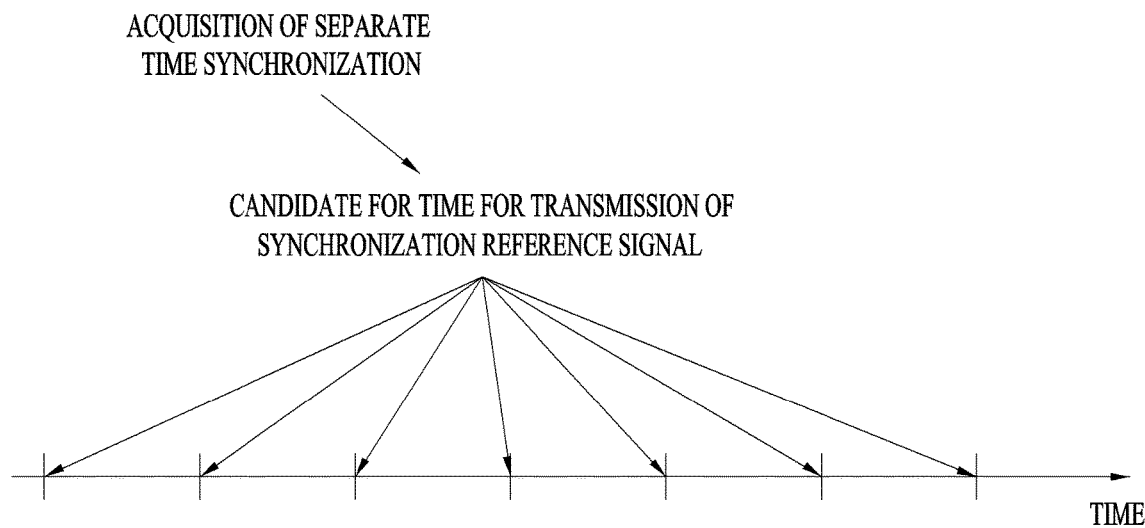
FIG. 30 is a diagram illustrating a restriction on an operation of transmitting the synchronization reference signal by a UE according to an embodiment of the present invention.

FIG. 30 illustrates a restriction on an operation of transmitting the synchronization reference signal by the UE according to an embodiment of the present invention.

In particular, in an operation in which a plurality of UEs stochastically become representative UEs to transmit the synchronization reference signal, the rule related to the point in time at which the synchronization reference signal may be transmitted is effective in allowing UEs receiving the reference signal to be indirectly matched with the separate time synchronization. As an example, when a UE can detect a PSS/SSS of a particular cell, a rule may be provided such that the synchronization reference signal may be transmitted only at a boundary point of a subframe having a period of 1 ms derived from the PSS/SSS, a boundary point of a radio frame having a period of 10 ms, or a point in time obtained by adding or subtracting a predetermined certain offset to or from the boundary point.

As another example, when the UE acquires time synchronization from an external time synchronization reference such as a satellite, an operation may be performed such that points in time separated from a particular point in time by multiples of a certain interval are identified as candidates for a position at which the synchronization reference signal can be transmitted, and the reference signal is transmitted from only one of the candidates.

In particular, this operation may be effective when UEs are relatively close to a cell formed by the eNB since a D2D signal may be transmitted and received in the same time unit as that of PDSCH or PUSCH transmission in subframes in the cell formed by the eNB, and thus a constant interference level may be maintained in one subframe.

After the UE transmits the synchronization reference signal according to the above-described embodiment, it is possible to transmit various setting information necessary for genuine transmission and reception of a signal between UEs. The setting information may include information such as a bandwidth or a transmission power level used for transmission and reception of a signal between UEs, and have a form of a message distinguished from a signal transmitted and received between other UEs.

Reception UEs may verify the fact that the setting information is transmitted from the same representative UE transmitting the synchronization reference signal, and thus may use a signal used for transmission of the setting information, in particular, a DM-RS together with the above-described synchronization reference signal to perform time/frequency synchronization, for example, to correct a residual error of synchronization acquired through the synchronization reference signal. When synchronization can be sufficiently performed only using a signal of the first region, transmission in the second region may be omitted. In the first region, when synchronization can be sufficiently performed only using the PSS, the SSS may be omitted.

Hereinafter, a description will be given of a method of determining a CP length when the PSS/SSS is repeatedly transmitted on several symbols for D2D synchronization.

Figure 31:
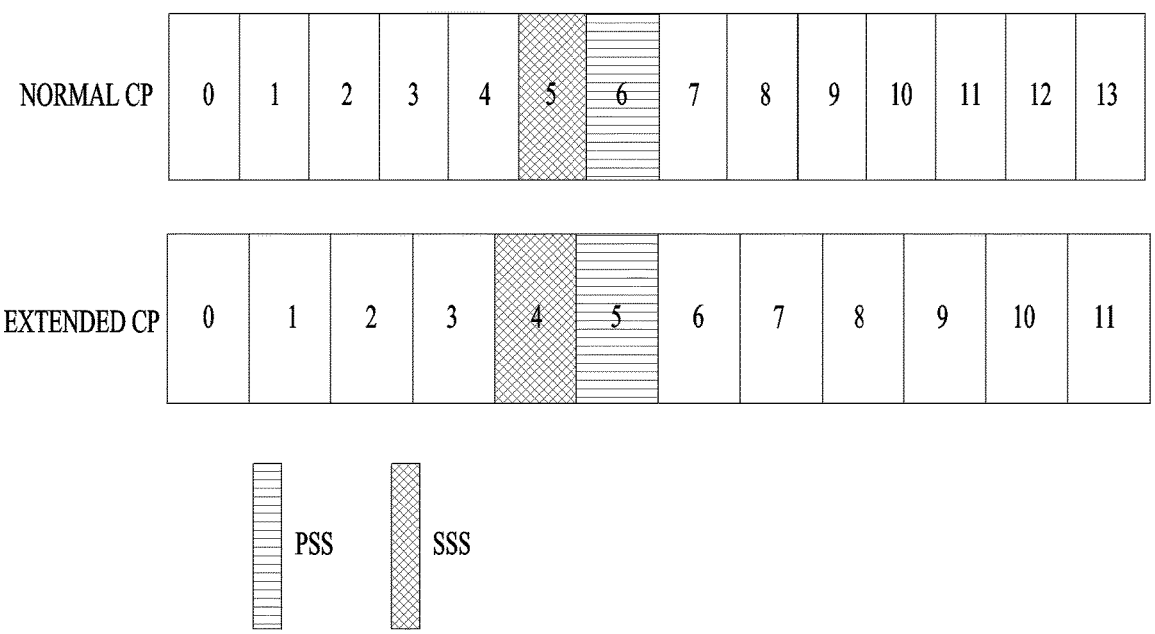
FIG. 31 is a diagram illustrating a scheme of transmitting a PSS/SSS according to a CP length by an eNB in an LTE FDD system.

FIG. 31 illustrates a scheme of transmitting a PSS/SSS according to a CP length by the eNB in the LTE FDD system.

Referring to FIG. 31, a start point of the PSS is different between a normal CP length and an extended CP length. However, a CP occupies some intervals from a start point due to a configuration using OFDM. Thus, the normal CP length and the extended CP length have the same period between a transmission start point and a transmission end point of a PSS signal in a portion excluding the CP.

Therefore, a reception UE may identify a slot boundary (that is, a subframe boundary) from a point at which the PSS ends by detecting the PSS, and detect the SSS based on the identified slot boundary. In this instance, a position of the SSS, that is, a point at which transmission of the SSS ends varies depending on a CP length. Thus, the UE performs blind detection of the normal CP and the extended CP when the SSS is detected. In other words, a CP length is presumed to correspond to the normal CP and the extended CP when a particular SSS sequence is detected, and a CP from which the SSS is actually detected is verified. In this process, the UE may spontaneously verify a CP length used by the eNB.

Meanwhile, when a PSS/SSS for D2D communication is repeated several times in one subframe, an operation of detecting the PSS/SSS by the UE according to a CP length needs to be regulated. In general, the UE detects a subframe boundary through the PSS. Thus, when the PSS is detected, the UE needs to repeatedly attempt detection in significantly minute time units without information about a point in time at which the PSS is received. Therefore, implementation of the UE may be simplified as much as possible when uncertainty about an attempt to detect the PSS, for example, uncertainty about PSS sequences or positions of repeated PSSs is minimized. On the other hand, a subframe boundary of the SSS is acquired through the PSS. Thus, only two CP lengths correspond to uncertainty about a point in time at which the SSS is received. Therefore, even when uncertainty about SSS sequences or positions of repeated SSSs is great, the UE may be implemented without a significant problem.

Hereinafter, a description will be given of a scheme of transmitting and receiving a D2D PSS/SSS capable of minimizing uncertainty when a PSS for D2D communication is detected according to the above-described principle. In particular, a description will be given of a solution to the fact that positions of repeated PSSs generated when the PSS is repeated on several symbols vary depending on CP length.

First, the PSS for D2D communication may have a constant CP length at all times in order to eliminate uncertainty about positions of repeated PSSs. Preferably, a rule may be provided to use an extended CP which is more robust to a multi-path environment. Besides the repeatedly transmitted PSS, for example, an SSS is repeated according to a CP length actually used for D2D communication.

Figure 32:
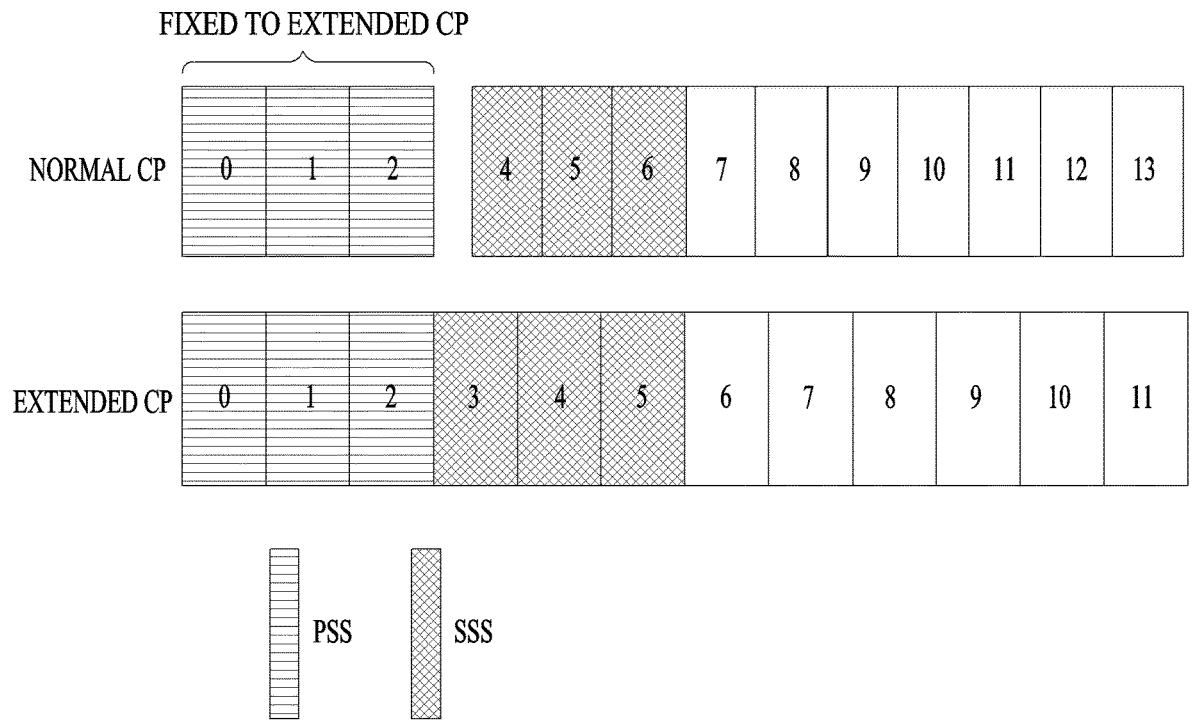
FIG. 32 is a diagram illustrating a scheme of transmitting a PSS/SSS according to CP length by a UE according to an embodiment of the present invention.

FIG. 32 illustrates a scheme of transmitting a PSS/SSS according to CP length by a UE according to an embodiment of the present invention.

First, FIG. 32 corresponds to a configuration in which a PSS is repeated three times as an extended CP at a point in time at which a subframe is started, and then an SSS is repeated three times again according to an actually used CP length. As illustrated in FIG. 32, it can be understood that, when the SSS uses a normal CP, a difference from a CP length of the PSS is generated, and thus a certain interval is present between two signals. In this way, a UE receiving the PSS repeated at constant positions at all times with a fixed CP length acquires a subframe boundary based on the repeated PSSs, attempts detection of an SSS while presuming a normal CP and a extended CP, and regards a CP length which is presumed when a final SSS is detected as an actual D2D CP length.

In particular, this operation may be applied to transmission of a PSS/SSS for a D2D UE that operates outside a network coverage area in which no information about a D2D operation parameter can be obtained before detection of a PSS/SSS for D2D communication. The PSS/SSS for the D2D UE that operates outside the network coverage area may include a PSS/SSS transmitted by a UE inside the network coverage area to perform D2D communication with a UE outside the network coverage area. In addition, a UE operating in the network coverage area may previously identify a CP length to be used for D2D communication through an indication by the eNB, and thus an indicated constant CP length may be applied to the PSS/SSS.

Referring to FIG. 32, positions and the number of repeated PSSs/SSSs, and an interval between repeated symbols are merely examples. The principle of the present invention may be applied without change even when the positions or the number of repeated PSSs/SSSs vary. In addition, a normal CP length may be selected as a fixed PSS CP length. In particular, the normal CP length is more likely to be selected when a configuration of continuously repeated PSSs is used and a PSS of a previous symbol can be used as a CP of a PSS of a subsequent symbol.

Figure 33:
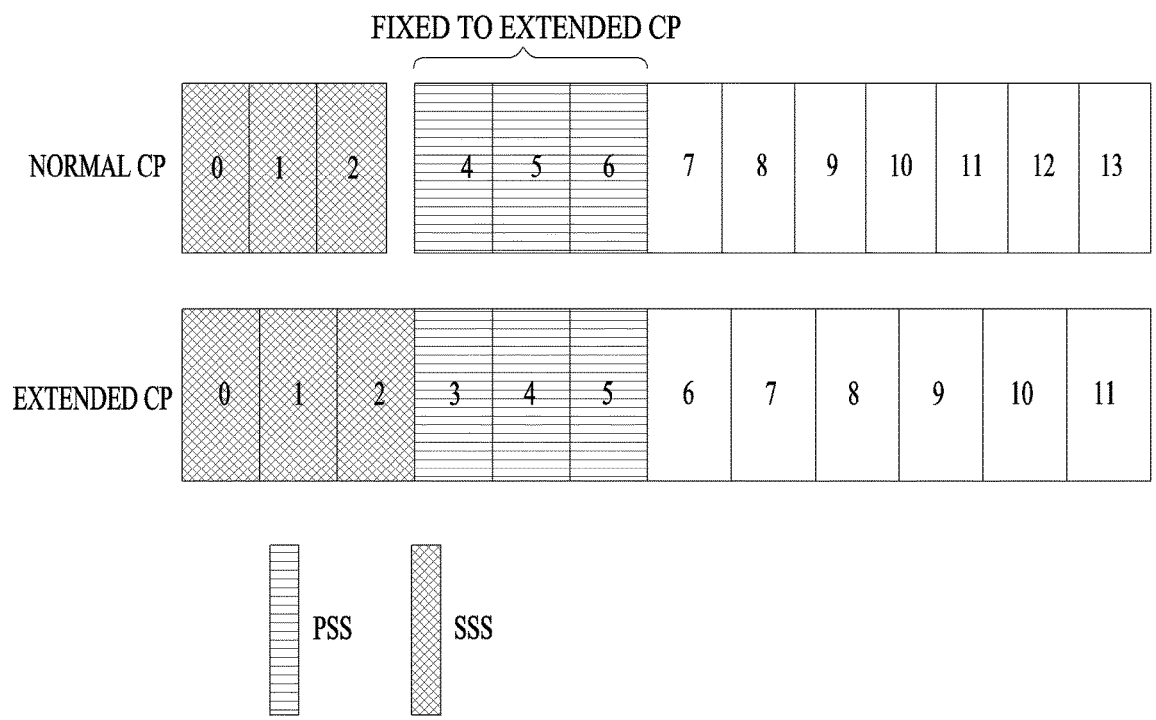
FIGS. 33 and 34 are diagrams illustrating other schemes of transmitting the PSS/SSS according to CP length by the UE according to embodiments of the present invention.
Figure 34:
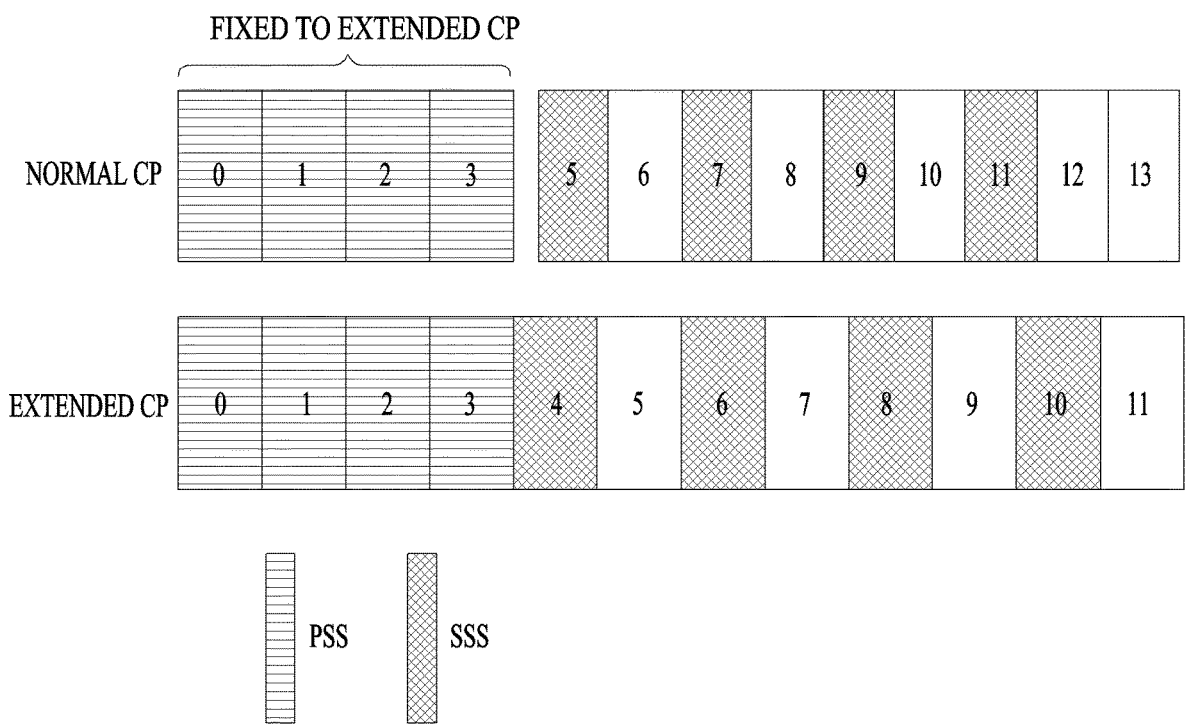

FIGS. 33 and 34 illustrate other schemes of transmitting a PSS/SSS according to a CP length by a UE according to embodiments of the present invention.

In particular, FIG. 33 is a modified example of FIG. 32. FIG. 33 corresponds to a case in which an SSS initially appears, and then a PSS fixed to an extended CP appears. In addition, FIG. 34 corresponds to a case in which a PSS is repeated four times as an extended CP, and then an SSS is repeated four times in a subsequent region. In this instance, respective SSS symbols are spaced apart by one symbol.

Some or all symbols not used as a PSS or an SSS in FIGS. 32 and 33 may be used to deliver additional information necessary for synchronization in D2D communication.

Additionally, a rule may be provided such that a PSS for D2D communication is transmitted in a CP length used for D2D communication, and the CP length used by the PSS is determined based on a sequence of the PSS, in other words, a parameter used to generate the PSS. For example, all possible PSS sequences (or generation parameters) may be divided into two groups to link one group to a normal CP and link the other group to an extended CP. Then, a UE transmitting a PSS for D2D communication using a particular CP length uses only a sequence belonging to a linked group.

When a PSS of a sequence belonging to a particular group is detected, a reception UE may presume only a CP length linked to the group. Thus, it is possible to prevent a complex operation of attempting detection on the assumption of two CP lengths for the same sequence.

In particular, this operation may be applied to transmission of a PSS/SSS for a UE operating outside the network coverage area, and a UE operating inside the network coverage area may previously identify a CP length to be used for D2D communication through an indication by the eNB, and thus may operate to use all possible PSS/SSS sequences.

Additionally, a rule may be provided such that a PSS for D2D communication is transmitted on the assumption of a constant CP length, for example, an extended CP at all times, and other signals transmitted together in the same slot or the same subframe as that of the PSS including an SSS is transmitted in the same constant CP length. In this case, a CP length to be used in genuine transmission and reception of a D2D signal thereafter may be designated through separate signaling, and an eNB may designate the CP length using an upper layer signal such as an RRC signal for a UE inside a coverage area of the eNB.

Alternatively, a UE transmitting a PSS/SSS for D2D communication may designate a CP length to be used in a future D2D operation through a separate channel, preferably, a channel for synchronization transmitted together with the PSS/SSS. In particular, this operation may be applied to transmission of a PSS/SSS for a UE operating outside the network coverage area. A D2D UE operating inside the network coverage area may previously identify a CP length to be used in D2D communication through an indication by the eNB, and thus operate such that the PSS/SSS uses both CP lengths.

A description will be given of a specific method of distinguishing a CP length using the above-described PSS/SSS sequence.

A PSS/SSS used for synchronization of D2D communication is generated from the above-described synchronization reference ID. In this instance, the synchronization reference ID may be divided into three groups, which is particularly suitable for a case in which a PSS has three types of root indices. First, one synchronization reference ID may be reserved to be used when a UE outside a coverage area corresponds to a reference of synchronization since a device for setting a CP length such as an eNB is not present, and thus a particular CP length determined in advance is used, and thus a method of distinguishing a CP length is insignificant.

Two remaining synchronization reference ID groups are allocated to generation of a PSS/SSS transmitted by a UE inside a coverage area of an eNB. Each of the synchronization reference ID groups is divided into a case of a normal CP and a case of an extended CP, and used according to a CP length of D2D communication set by an eNB.

The above-described three groups may be implemented in a form in which IDs, remainders of which obtained by dividing a synchronization reference ID by 3 are the same, are grouped. When a PSS has three types of root indices (or when a root index of a PSS varies according to a predetermined rule on repeated symbols, and a change pattern thereof has three types), a rule may be provided such that one group uses one index (or one change pattern).

A reception UE detects a PSS/SSS transmitted by another UE, and acquires a synchronization reference ID through the detected PSS/SSS. Thereafter, in a case in which the synchronization reference ID is allocated to a PSS/SSS of a UE outside a coverage area, the reception UE uses a CP length determined in advance for the case for a future D2D operation. A normal CP is used for the future D2D operation when the synchronization reference ID is allocated to a PSS/SSS corresponding to a case in which the UE inside the coverage area uses the normal CP, and an extended CP is used for the future D2D operation when the synchronization reference ID is allocated to a PSS/SSS corresponding to a case in which the UE inside the coverage area uses the extended CP. In this instance, as in the extended CP, a value fixed in advance may be used as a CP length of PSS/SSS transmission.

Information below may be transmitted through the synchronization reference ID using a similar scheme.

1) Subframe Index (or Radio Frame Index)

A group of available synchronization reference IDs may be determined based on an index of a subframe in which the PSS/SSS is transmitted.

In this case, when a synchronization reference of the PSS/SSS corresponds to a UE outside a coverage area of an eNB, a subframe index is insignificant, and thus may be fixed to a particular value determined in advance. On the other hand, when the synchronization reference corresponds to a UE inside the coverage area of the eNB, an index of a transmission subframe of the PSS/SSS may be designated at the actual timing of the eNB.

For example, when the synchronization reference corresponds to the UE inside the coverage area of the eNB as in a case of the CP length, a plurality of synchronization reference ID groups may be configured to allocate one subframe index to each group.

2) System Bandwidth

A group of available synchronization reference IDs may be determined based on a system bandwidth presumed in D2D transmission and reception. In this case, when a synchronization reference of the PSS/SSS corresponds to a UE outside a coverage area of an eNB, a subframe index is fixed to a particular value determined in advance. On the other hand, when the synchronization reference corresponds to a UE inside the coverage area of the eNB, a system bandwidth actually set by the eNB may be designated.

For example, when the synchronization reference corresponds to the UE inside the coverage area of the eNB as in a case of the CP length, a plurality of synchronization reference ID groups may be configured to allocate one system bandwidth to each group.

Figure 35:
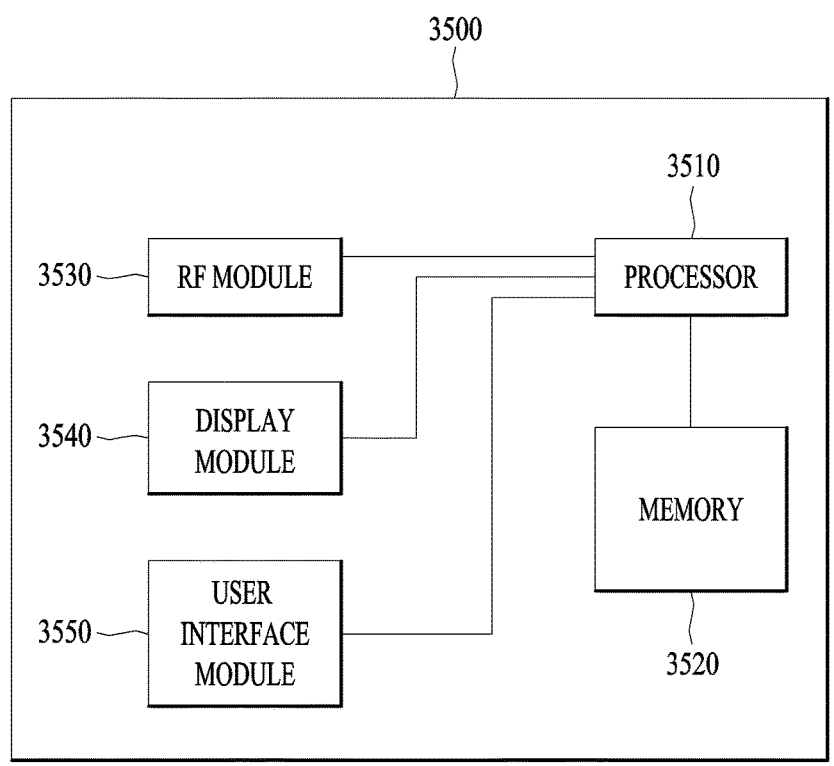
FIG. 35 is a block diagram of a communication apparatus according to an embodiment of the present invention.

FIG. 35 is a block diagram illustrating a communication apparatus in accordance with an embodiment of the present invention.

Referring to FIG. 35, a communication device 3500 includes a processor 3510, a memory 3520, a Radio Frequency (RF) module 3530, a display module 3540, and a user interface module 3550.

The communication device 3500 is illustrated for convenience of the description and some modules may be omitted. Moreover, the communication device 3500 may further include necessary modules. Some modules of the communication device 3500 may be further divided into sub-modules. The processor 3500 is configured to perform operations according to the embodiments of the present invention exemplarily described with reference to the figures. Specifically, for the detailed operations of the processor 3500, reference may be made to the contents described with reference to FIGS. 1 to 34.

The memory 3520 is connected to the processor 3510 and stores operating systems, applications, program code, data, and the like. The RF module 3530 is connected to the processor 3510 and performs a function of converting a baseband signal into a radio signal or converting a radio signal into a baseband signal. For this, the RF module 3530 performs analog conversion, amplification, filtering, and frequency upconversion or inverse processes thereof. The display module 3540 is connected to the processor 3510 and displays various types of information. The display module 3540 may include, but is not limited to, a well-known element such as a Liquid Crystal Display (LCD), a Light Emitting Diode (LED), or an Organic Light Emitting Diode (OLED). The user interface module 3550 is connected to the processor 3510 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

Even though a description has been made focusing on an example in which a method of transmitting and receiving a synchronization signal for D2D communication in the above-described wireless communication system and an apparatus for the same are applied to the 3GPP LTE system, the method and the apparatus may be applied to various other wireless communication systems.

What is claimed is:

1. A method for transmitting synchronization signals for a Device-to-Device (D2D) link at a user equipment (UE) in a wireless communication system, the method comprising;
   generating a primary synchronization signal (PSS) for the D2D link and a secondary synchronization signal (SSS) for the D2D link; and
   transmitting the PSS for the D2D link and the SSS for the D2D link to another UE in a subframe,
   wherein the PSS for the D2D link is mapped adjacent two symbols in the subframe.

2. The method of claim 1, wherein the SSS for the D2D link is mapped to another adjacent two symbols in the subframe located after the adjacent two symbols to which the PSS for the D2D link is mapped.

3. The method of claim 1, wherein the another adjacent two symbols to which the PSS for the D2D link is mapped are located after a predetermined number of symbols from the adjacent two symbols to which the PSS for the D2D link is mapped.

4. The method of claim 1, wherein the PSS for the D2D link is generated by using a sequence generation index for the D2D link, wherein the sequence generation index for the D2D link is different from a plurality of sequence generation indexes for a link between the UE and a base station (BS).

5. A user equipment (UE) in a wireless communication system, the UE comprising;
a Radio Frequency (RF) module; and
a processor connected with the RF module and configured to:
generate a primary synchronization signal (PSS) for a Device-to-Device (D2D) link and a secondary synchronization signal (SSS) for the D2D link; and
transmit the PSS for the D2D link and the SSS for the D2D link to another UE in a subframe,
wherein the PSS for the D2D link is mapped adjacent two symbols in the subframe.

6. The UE of claim 5, wherein the SSS for the D2D link is mapped to another adjacent two symbols in the subframe located after the adjacent two symbols to which the PSS for the D2D link is mapped.

7. The UE of claim 5, wherein the another adjacent two symbols to which the PSS for the D2D link is mapped are located after a predetermined number of symbols from the adjacent two symbols to which the PSS for the D2D link is mapped.

8. The UE of claim 5, wherein the PSS for the D2D link is generated by using a sequence generation index for the D2D link,
wherein the sequence generation index for the D2D link is different from a plurality of sequence generation indexes for a link between the UE and a base station (BS).

* * * * *